US012764152B2

(12) United States Patent
Saxena et al.

(10) Patent No.: US 12,764,152 B2
(45) Date of Patent: Oct. 13, 2026

(54) EVALUATION OF STABILITY OF EDGE-BASED COMMUNICATION NETWORKS

(71) Applicant: International Business Machines Corporation, Armonk, NY (US)

(72) Inventors: Rajesh Kumar Saxena, Thane West (IN); Harish Bharti, Pune (IN); Sandeep Sukhija, Sri Ganganagar (IN)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 19/008,739

(22) Filed: Jan. 3, 2025

(65) Prior Publication Data

US 2026/0197339 A1 Jul. 9, 2026

(51) Int. Cl.
*H04L 9/40* (2022.01)

(52) U.S. Cl.
CPC ...... *H04L 63/1433* (2013.01); *H04L 63/1416* (2013.01)

(58) Field of Classification Search
CPC ........................ H04L 63/1416; H04L 63/1433
See application file for complete search history.

(56) References Cited

U.S. PATENT DOCUMENTS

2014/0304214 A1 10/2014 Sakunkoo et al.

FOREIGN PATENT DOCUMENTS

| | | | | | |
|---|---|---|---|---|---|
| CN | 116560263 A | * | 8/2023 | ......... | G05B 19/0423 |
| CN | 116721535 A | * | 9/2023 | ............... | G08G 1/20 |
| CN | 118331327 B | * | 10/2024 | ............. | G05D 1/695 |

OTHER PUBLICATIONS

Bektemyssova, et al., Building a Semantic Knowledge Graph Search Model for Finding a Casual Answer, Retrieved from: https://doi.org/10318280/ria.380125, May 24, 2023, vol. 38, No. 1, pp. 243-250.

Jia, et al., Lyapunov Optimization based Mobile Edge Computing for Internet of Vehicles Systems, IEEE Transaction on Communications, Nov. 2022, vol. 70, Issue 11, 16 pages.

Sadique, et al., IMSC-EIoTD: Identity Management and Secure Communication for Edge IoT Devices, Sensors, Oct. 12, 2020, vol. 20, Issue. 22, 37 pages.

Sarikaya, et al., Stability and Dynamic Control of Underlay Mobile Edge Networks, arXiv:1803.10623v1 [cs.IT], Mar. 26, 2018, 16 pages.

Tian, et al., State Estimation in Mobile Edge Computing with Unreliable Communications, IEEE Communications Letters, Dec. 28, 2020, vol. 25, Issue 4, 4 pages.

* cited by examiner

*Primary Examiner* — Theodore C Parsons
(74) *Attorney, Agent, or Firm* — CHIP LAW GROUP

(57) ABSTRACT

Evaluation of stability in edge-based communication networks includes obtaining a first attribute of a candidate entity within a plurality of entities in the network. A partition model is generated based on the first attribute and a semantic graph representing relationships among entities. Time-series data reflecting various states of the network over time is generated, followed by the generation of stability data using advanced scalar functions that is the Lyapunov function. By analyzing the stability data and transitions between network states, causal entities contributing to instability are identified. The root cause data is generated and targeted repair commands are output to resolve the instability.

20 Claims, 14 Drawing Sheets

EVALUATION OF STABILITY OF EDGE-BASED COMMUNICATION NETWORKS

BACKGROUND

The disclosure relates to evaluation of stability and, more particularly, to evaluation of stability in edge-based communication networks.

Edge-Based Networks play a crucial role in the modern computing world. These networks are critical in handling the enormous amounts of data generated by devices at the networks' edges. The complexity of these networks is heightened by the continuous evolution of device states, communication protocols, and the dynamic nature of network topology. As the network expands, maintaining operational stability becomes more difficult, with potential issues such as communication bottlenecks, device failures, and security threats like Distributed Denial of Service (DDoS) attacks posing significant risks. The data sent by edge devices is insufficient to ascertain causation and growth patterns of network instability in edge-based networks.

Current solutions fail to mitigate risks in the edge-based networks arising due to the aforementioned issues.

SUMMARY

According to an embodiment of the disclosure, a computer-implemented method for generating root cause data pertaining to the stability of edge-based communication networks is described. The computer-implemented method includes obtaining, by a computer, at least one first attribute of a plurality of attributes. Each attribute of the plurality of attributes is associated with an entity of a plurality of entities within the edge-based network of communication devices. The at least one first attribute is associated with a candidate entity of the plurality of entities. The computer-implemented method further includes generating, by the computer, at least one partition model of the edge-based network based on the at least one attribute of the candidate entity and a semantic graph of the edge-based network. The semantic graph includes a plurality of nodes that correspond to the plurality of attributes. The at least one partition model is parameterized as a time-evolving function that defines a plurality of first states of the edge-based network as a function of time. The computer-implemented method further includes generating, by the computer, time-series data corresponding to a plurality of second states of the plurality of first states of the edge-based network between a first time epoch and a second time epoch of the edge-based network, based on the at least one partition model. Each state of the plurality of second states corresponds to a respective time instance of a plurality of time instances between the first time epoch and the second time epoch. The method also includes generating, by the computer, stability data for the edge-based network, based on the time-series data and a scalar function. The stability data indicates at least one scalar measurement of stability antipattern for the edge-based network. The at least one scalar measurement corresponds to at least one solution of an optimization problem for at least one time instance of the plurality of time instances between the first time epoch and the second time epoch. The computer-implemented method further includes determining, by the computer, a curvature of a state transition for the edge-based network between the plurality of time instances, based on the stability data. The at least one solution of the optimization problem defines the state transition for the edge-based network. Still, further, the computer-implemented method includes determining, by the computer, at least one second attribute of the plurality of attributes, based on the stability data and the curvature of the state transition. The at least one second attribute is associated with a causal entity of the plurality of entities that contributes to instability in the edge-based network. Furthermore, the method includes generating, by the computer, the root cause data corresponding to the instability in the edge-based network, based on the at least one second attribute of the causal entity.

According to one or more embodiments of the disclosure, a system for evaluation of stability of edge-based communication networks is described. The system includes a processor set, one or more computer-readable storage media, and program instructions stored on the one or more computer-readable storage media. The program instructions are executable by the processor set to cause the processor set to generate root cause data pertaining to instability in an edge-based communication network. The program instructions are executable by the processor set to cause the processor set to obtain at least one first attribute of a plurality of attributes. Each attribute of the plurality of attributes is associated with an entity of a plurality of entities within the edge-based network of communication devices. The at least one first attribute is associated with a candidate entity of the plurality of entities. The program instructions are executable by the processor set to cause the processor set to generate at least one partition model of the edge-based network based on the at least one attribute of the candidate entity and a semantic graph of the edge-based network. The semantic graph includes a plurality of nodes that correspond to the plurality of attributes. The at least one partition model is parameterized as a time-evolving function that defines a plurality of first states of the edge-based network as a function of time. The program instructions are executable by the processor set to cause the processor set to generate time-series data corresponding to a plurality of second states of the plurality of first states of the edge-based network between a first time epoch and a second time epoch of the edge-based network, based on the at least one partition model. Each state of the plurality of second states corresponds to a respective time instance of a plurality of time instances between the first time epoch and the second time epoch. The program instructions are executable by the processor set to cause the processor set to generate stability data for the edge-based network, based on the time-series data and a scalar function. The stability data indicates at least one scalar measurement of stability antipattern for the edge-based network. The at least one scalar measurement corresponds to at least one solution of an optimization problem for at least one time instance of the plurality of time instances between the first time epoch and the second time epoch. The program instructions are executable by the processor set to cause the processor set to determine a curvature of a state transition for the edge-based network between the plurality of time instances, based on the stability data. The at least one solution for the optimization problem defines the state transition for the edge-based network. Furthermore, the program instructions are executable by the processor set to cause the processor set to determine at least one second attribute of the plurality of attributes, based on the stability data and the curvature of the state transition. The at least one second attribute is associated with a causal entity of the plurality of entities that contributes to instability in the edge-based network. Furthermore, the program instructions are executable by the processor set to cause the processor set to generate the root cause data corresponding to the instability in the edge-based network, based on the at least one second attribute of the causal entity.

According to one or more embodiments of the disclosure, a computer program product for generating root cause data of instability in an edge-based network of communication devices is described. The computer program product includes one or more computer-readable storage media and program instructions stored on the one or more computer-readable storage media to perform operations comprising obtaining, at least one first attribute of a plurality of attributes. Each attribute of the plurality of attributes is associated with an entity of a plurality of entities within the edge-based network of communication devices. The at least one first attribute is associated with a candidate entity of the plurality of entities. The operations further include generating at least one partition model of the edge-based network based on the at least one attribute of the candidate entity and a semantic graph of the edge-based network. The semantic graph includes a plurality of nodes that correspond to the plurality of attributes. The at least one partition model is parameterized as a time-evolving function that defines a plurality of first states of the edge-based network as a function of time. The operations further include generating time-series data corresponding to a plurality of second states of the plurality of first states of the edge-based network between a first time epoch and a second time epoch of the edge-based network, based on the at least one partition model. Each state of the plurality of second states corresponds to a respective time instance of a plurality of time instances between the first time epoch and the second time epoch. The operations further include generating stability data for the edge-based network, based on the time-series data and a scalar function. The stability data indicates at least one scalar measurement of stability antipattern for the edge-based network. The at least one scalar measurement corresponds to at least one solution of an optimization problem for at least one time instance of the plurality of time instances between the first time epoch and the second time epoch. Further, the operations include determining a curvature of a state transition for the edge-based network between the plurality of time instances, based on the stability data. The at least one solution for the optimization problem defines the state transition for the edge-based network. The operations further include determining at least one second attribute of the plurality of attributes, based on the stability data and the curvature of the state transition. The at least one second attribute is associated with a causal entity of the plurality of entities that contributes to instability in the edge-based network. Furthermore, the operations include generating the root cause data corresponding to the instability in the edge-based network, based on the at least one second attribute of the causal entity.

Additional technical features and benefits are realized through the techniques of the disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The following description will provide details of preferred embodiments with reference to the following figures where.

DETAILED DESCRIPTION

Figure 1:
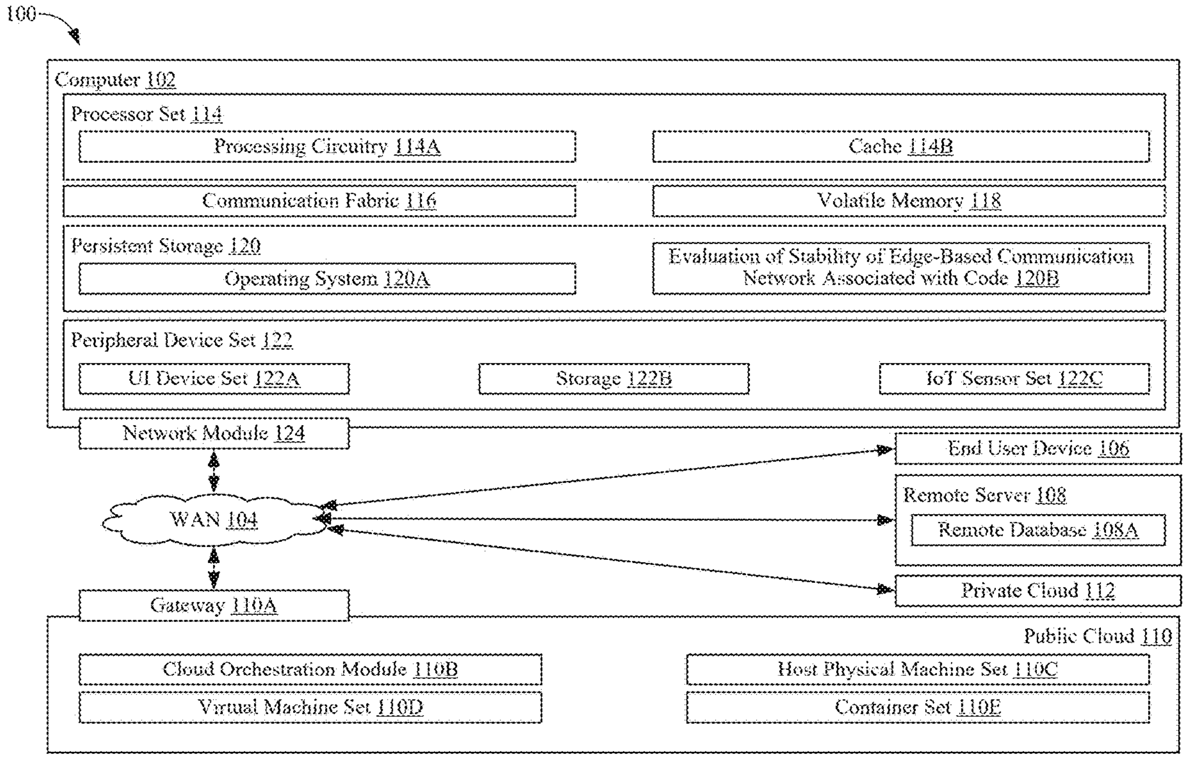
FIG. 1 is a diagram that illustrates a computing environment for evaluation of stability of edge-based communication networks, in accordance with an embodiment of the disclosure.

Edge-based networks include a highly distributed computing paradigm where computer primitives are moved to the edge of the network close to the users and devices that need them. As a result, edge-based networks may reduce latency, minimize bandwidth needs, reduce costs, improve security, and enhance user or customer experiences. In an edge network, the resources that provide computer processing, storage, networking, security, and other capabilities may be physically located at points of presence (Pops) that are geographically nearer to the users and devices that produce, process, and consume data.

Edge-based networks address the massive growth of data that is part of digital transformation. In modern computing environments, many applications and use cases are highly data-intensive and latency-sensitive. Services like streaming media, self-driving vehicles, healthcare devices that monitor patient vitals, smart city solutions for directing traffic, and IoT devices that control industrial manufacturing processes all require a network that offers high performance, ultra-low latency, and strong security. Edge-based networks make this possible by moving computing functions away from centralized data centers and cloud environments and allowing these processes to take place at a network's edge, closer to where data is created and consumed.

The data sent by edge-based computers to centralize systems is leveraged for various technical applications such as determining operational efficiency, compliance reporting, environmental analysis, and condition-based asset monitoring in the networks. The increasing complexity and expansion of edge-based communication networks have presented significant challenges in ensuring network stability, particularly within highly distributed systems. However, the decentralized and dynamic nature of these networks makes it difficult to predict and mitigate stability issues effectively. Network instability in these systems may lead to consequences, such as service interruptions, performance degradation, and, in extreme cases, complete network failure.

Available methods for assessing the stability of edge-based networks typically rely on reactive approaches, such as manual monitoring of network performance metrics and post-incident troubleshooting. These techniques are time-consuming, inefficient, and limited in scope. They primarily focus on addressing issues after they occur, leading to delays in problem detection and resolution, which may result in extended downtime or diminished network performance which may be undesirable and often critical for several applications. Furthermore, conventional solutions do not fully leverage the network's real-time data, limiting their ability to predict future instabilities based on the evolving state of the network.

Existing solutions for monitoring and evaluating network stability are often fragmented and reactive, focusing either on real-time metrics or post-incident analysis. These solutions lack the ability to model the time-evolving nature of edge-based networks and to predict potential instability before it impacts the system. They also fail to integrate various attributes from network entities, limiting their ability to provide a comprehensive evaluation of network health.

To overcome these limitations, there is a need for proactive solutions that may continuously monitor the dynamic states of an edge-based communication network, predict potential instabilities, and identify the underlying causes before they lead to network failure. By incorporating the operational data of edge-based networks, a system may more accurately evaluate and predict the stability of these networks and mitigate risks in the edge-based networks. Such a system may provide real-time insights into the network's performance and provide timely intervention to maintain stability and reliability of the network. This requires the establishment of an Identity Semantic Network (ISN) model that enables the definition, capture, and analysis of the operational data, providing information about the stability of the edge-based network.

Various example embodiments of the disclosure provide systems and methods for continuous evaluation of stability in edge-based communication networks in a continuous manner. In this regard, various example embodiments utilize a partition model built from a semantic graph of network attributes, such as, but not limited to devices, regions, and satellites. Such a partition model evolves over time to generate time-series data that reflects the dynamic states of the network. By applying advanced stability estimation techniques, like Lyapunov drift and Lyapunov function, the methods and systems may predict potential areas of instability within the network. Furthermore, the proposed system identifies specific entities contributing to these instabilities, enabling proactive intervention to maintain network stability.

This integrated approach not only enhances the ability to maintain stability in edge-based communication networks more effectively and efficiently but also significantly reduces the resources required to address potential network instability. By automating the processes of monitoring, prediction, detection, and root cause identification, the proposed systems and methods provide comprehensive defense mechanisms against evolving instability challenges in dynamic and complex network environments. The system's proactive nature ensures that issues are identified and addressed before they lead to significant disruptions, improving the edge-based network.

According to an embodiment of the disclosure, a computer-implemented method for generating root cause data pertaining to the stability of edge-based communication networks is described. The computer-implemented method includes obtaining, by a computer, at least one first attribute of a plurality of attributes. Each attribute of the plurality of attributes is associated with an entity of a plurality of entities within the edge-based network of communication devices. The at least one first attribute is associated with a candidate entity of the plurality of entities. The computer-implemented method further includes generating, by the computer, at least one partition model of the edge-based network based on the at least one attribute of the candidate entity and a semantic graph of the edge-based network. The semantic graph includes a plurality of nodes that correspond to the plurality of attributes. The at least one partition model is parameterized as a time-evolving function that defines a plurality of first states of the edge-based network as a function of time. The computer-implemented method further includes generating, by the computer, time-series data corresponding to a plurality of second states of the plurality of first states of the edge-based network between a first time epoch and a second time epoch of the edge-based network, based on the at least one partition model. Each state of the plurality of second states corresponds to a respective time instance of a plurality of time instances between the first time epoch and the second time epoch. The method also includes generating, by the computer, stability data for the edge-based network, based on the time-series data and a scalar function. The stability data indicates at least one scalar measurement of stability antipattern for the edge-based network. The at least one scalar measurement corresponds to at least one solution of an optimization problem for at least one time instance of the plurality of time instances between the first time epoch and the second time epoch. The computer-implemented method further includes determining, by the computer, a curvature of a state transition for the edge-based network between the plurality of time instances, based on the stability data. The at least one solution of the optimization problem defines the state transition for the edge-based network. Still, further, the computer-implemented method includes determining, by the computer, at least one second attribute of the plurality of attributes, based on the stability data and the curvature of the state transition. The at least one second attribute is associated with a causal entity of the plurality of entities that contributes to instability in the edge-based network. Furthermore, the method includes generating, by the computer, the root cause data corresponding to the instability in the edge-based network, based on the at least one second attribute of the causal entity.

In various embodiments of the disclosure, the computer-implemented method further includes querying, by the computer, the semantic graph based on the at least one first attribute of the candidate entity. The computer-implemented method further includes extracting, by the computer, at least one node of the plurality of nodes, based on the querying of the semantic graph. The at least one node corresponds to the at least one first attribute of the candidate entity.

In various embodiments of the disclosure, the plurality of attributes includes a region identifier associated with each entity of the plurality of entities, a device identifier associated with each entity of the plurality of entities, a time epoch for emitting data for each entity of the plurality of entities, and a satellite identifier associated with each entity of the plurality of entities.

In various embodiments of the disclosure, the computer-implemented method further includes receiving, by the computer, incident data corresponding to a distributed denial of service in the edge-based network. The computer-implemented method further includes extracting, by the computer, the at least one first attribute of the candidate entity, based on the incident data.

In various embodiments of the disclosure, the computer-implemented method further includes generating, by the computer, the at least one partition model of the edge-based network, based on at least one template that defines at least one structural relationship between the plurality of entities.

In various embodiments of the disclosure, the scalar function is a Lyapunov function, and the curvature of the state transition corresponds to Lyapunov drift.

In various embodiments of the disclosure, the root cause data includes the at least one second attribute of the causal entity and causal relationship information defining a causal relationship between the causal entity and the instability in the edge-based network.

In various embodiments of the disclosure, the computer-implemented method further includes generating, by the computer, targeted repair commands for fixing the instability in the edge-based network, based on the root cause data.

According to one or more embodiments of the disclosure, a system for evaluation of stability of edge-based communication networks is described. The system includes a processor set, one or more computer-readable storage media, and program instructions stored on the one or more computer-readable storage media. The program instructions are executable by the processor set to cause the processor set to generate root cause data pertaining to instability in an edge-based communication network. The program instructions are executable by the processor set to cause the processor set to obtain at least one first attribute of a plurality of attributes. Each attribute of the plurality of attributes is associated with an entity of a plurality of entities within the edge-based network of communication devices. The at least one first attribute is associated with a candidate entity of the plurality of entities. The program instructions are executable by the processor set to cause the processor set to generate at least one partition model of the edge-based network based on the at least one attribute of the candidate entity and a semantic graph of the edge-based network. The semantic graph includes a plurality of nodes that correspond to the plurality of attributes. The at least one partition model is parameterized as a time-evolving function that defines a plurality of first states of the edge-based network as a function of time. The program instructions are executable by the processor set to cause the processor set to generate time-series data corresponding to a plurality of second states of the plurality of first states of the edge-based network between a first time epoch and a second time epoch of the edge-based network, based on the at least one partition model. Each state of the plurality of second states corresponds to a respective time instance of a plurality of time instances between the first time epoch and the second time epoch. The program instructions are executable by the processor set to cause the processor set to generate stability data for the edge-based network, based on the time-series data and a scalar function. The stability data indicates at least one scalar measurement of stability antipattern for the edge-based network. The at least one scalar measurement corresponds to at least one solution of an optimization problem for at least one time instance of the plurality of time instances between the first time epoch and the second time epoch. The program instructions are executable by the processor set to cause the processor set to determine a curvature of a state transition for the edge-based network between the plurality of time instances, based on the stability data. The at least one solution for the optimization problem defines the state transition for the edge-based network. Furthermore, the program instructions are executable by the processor set to cause the processor set to determine at least one second attribute of the plurality of attributes, based on the stability data and the curvature of the state transition. The at least one second attribute is associated with a causal entity of the plurality of entities that contributes to instability in the edge-based network. Furthermore, the program instructions are executable by the processor set to cause the processor set to generate the root cause data corresponding to the instability in the edge-based network, based on the at least one second attribute of the causal entity.

In various embodiments of the disclosure, the program instructions further cause the processor set to query the semantic graph based on the at least one first attribute of the candidate entity and extract at least one node of the plurality of nodes, based on the query of the semantic graph. The at least one node corresponds to the at least one first attribute of the candidate entity.

In various embodiments of the disclosure, the plurality of attributes includes a region identifier associated with each entity of the plurality of entities, a device identifier associated with each entity of the plurality of entities, a time epoch for emitting data for each entity of the plurality of entities, and a satellite identifier associated with each entity of the plurality of entities.

In various embodiments of the disclosure, the system further includes an interface configured to receive incident data corresponding to a distributed denial of service in the edge-based network. The program instructions further cause the processor set to extract the at least one first attribute of the candidate entity, based on the incident data.

In various embodiments of the disclosure, the program instructions further cause the processor set to generate the at least one partition model of the edge-based network, based on at least one template that defines at least one structural relationship between the plurality of entities.

In various embodiments of the disclosure, the scalar function is a Lyapunov function, and the curvature of the state transition corresponds to Lyapunov drift.

In various embodiments of the disclosure, the root cause data includes the at least one second attribute of the causal entity and causal relationship information defining a causal relationship between the causal entity and the instability in the edge-based network.

In various embodiments of the disclosure, the program instructions further cause the processor set to generate targeted repair commands for fixing the instability in the edge-based network, based on the root cause data.

According to one or more embodiments of the disclosure, a computer program product for generating root cause data of instability in an edge-based network of communication devices is described. The computer program product includes one or more computer-readable storage media and program instructions stored on the one or more computer-readable storage media to perform operations comprising obtaining, at least one first attribute of a plurality of attributes. Each attribute of the plurality of attributes is associated with an entity of a plurality of entities within the edge-based network of communication devices. The at least one first attribute is associated with a candidate entity of the plurality of entities. The operations further include generating, at least one partition model of the edge-based network based on the at least one attribute of the candidate entity and a semantic graph of the edge-based network. The semantic graph includes a plurality of nodes that correspond to the plurality of attributes. The at least one partition model is parameterized as a time-evolving function that defines a plurality of first states of the edge-based network as a function of time. The operations further include generating, time-series data corresponding to a plurality of second states of the plurality of first states of the edge-based network between a first time epoch and a second time epoch of the edge-based network, based on the at least one partition model. Each state of the plurality of second states corresponds to a respective time instance of a plurality of time instances between the first time epoch and the second time epoch. The operations further include generating stability data for the edge-based network, based on the time-series data and a scalar function. The stability data indicates at least one scalar measurement of stability antipattern for the edge-based network. The at least one scalar measurement corresponds to at least one solution of an optimization problem for at least one time instance of the plurality of time instances between the first time epoch and the second time epoch. Further, the operations include determining, a curvature of a state transition for the edge-based network between the plurality of time instances, based on the stability data. The at least one solution for the optimization problem defines the state transition for the edge-based network. The operations further include determining at least one second attribute of the plurality of attributes, based on the stability data and the curvature of the state transition. The at least one second attribute is associated with a causal entity of the plurality of entities that contributes to instability in the edge-based network. Furthermore, the operations include generating, the root cause data corresponding to the instability in the edge-based network, based on the at least one second attribute of the causal entity.

In various embodiments of the disclosure, the operations further include querying the semantic graph based on the at least one first attribute of the candidate entity. The operations further include extracting at least one node of the plurality of nodes, based on the querying of the semantic graph. The at least one node corresponds to the at least one first attribute of the candidate entity.

In various embodiments of the disclosure, the plurality of attributes includes a region identifier associated with each entity of the plurality of entities, a device identifier associated with each entity of the plurality of entities, a time epoch for emitting data for each entity of the plurality of entities, and a satellite identifier associated with each entity of the plurality of entities.

In various embodiments of the disclosure, the operations further include receiving incident data corresponding to a distributed denial of service in the edge-based network. The operations further include extracting the at least one first attribute of the candidate entity, based on the incident data.

Various aspects of the disclosure are described by narrative text, flowcharts, block diagrams of computer systems, and/or block diagrams of the machine logic included in computer program product (CPP) embodiments. With respect to any flowcharts, depending upon the technology involved, the operations may be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that may retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

FIG. 1 is a diagram that illustrates a computing environment for evaluation of stability of edge-based communication networks, in accordance with an embodiment of the disclosure. With reference to FIG. 1, there is shown a computing environment 100 that contains an example of an environment for the execution of at least some of the computer code involved in performing the disclosed methods, such as an evaluation of stability of edge-based communication network associated with code 120B. In addition to the evaluation of stability of edge-based communication network associated with code 120B, computing environment 100 includes, for example, a computer 102, a wide area network (WAN) 104, an end user device (EUD) 106, a remote server 108, a public cloud 110, and a private cloud 112. In this embodiment of the disclosure, the computer 102 includes a processor set 114 (including a processing circuitry 114A and a cache 114B), a communication fabric 116, a volatile memory 118, a persistent storage 120 (including an operating system 120A and the evaluation of stability of edge-based communication network associated with code 120B as identified above), a peripheral device set 122 (including a user interface (UI) device set 122A, a storage 122B, and an Internet of Things (IoT) sensor set 122C), and a network module 124. The remote server 108 includes a remote database 108A. The public cloud 110 includes a gateway 110A, a cloud orchestration module 110B, a host physical machine set 110C, a virtual machine set 110D, and a container set 110E.

The computer 102 may take the form of a desktop computer, a laptop computer, a tablet computer, a smartphone, a smartwatch or other wearable computer, a mainframe computer, a quantum computer, or any other form of a computer or a mobile device now known or to be developed in the future that is capable of running a program, accessing a network or querying a database, such as a remote database 108A. As is well understood in the art of computer technology, and depending upon the technology, the performance of a computer-implemented method may be distributed among multiple computers and/or between multiple locations. On the other hand, in this presentation of the computing environment 100, detailed discussion is focused on a single computer, specifically the computer 102, to keep the presentation as simple as possible. The computer 102 may be located in a cloud, even though it is not shown in a cloud in FIG. 1. On the other hand, computer 102 is not required to be in a cloud except to any extent as may be affirmatively indicated.

The processor set 114 includes one, or more, computer processors of any type now known or to be developed in the future. The processing circuitry 114A may be distributed over multiple packages, for example, multiple, coordinated integrated circuit chips. The processing circuitry 114A may implement multiple processor threads and/or multiple processor cores. The cache 114B may be memory that is located in the processor chip package(s) and is typically used for data or code that should be available for rapid access by the threads or cores running on the processor set 114. Cache memories are typically organized into multiple levels depending upon relative proximity to the processing circuitry 114A. Alternatively, some, or all, of the cache 114B for the processor set 114 may be located "off-chip." In some computing environments, the processor set 114 may be designed for working with qubits and performing quantum computing.

Computer readable program instructions are typically loaded onto the computer 102 to cause a series of operations to be performed by the processor set 114 of the computer 102 and thereby effect a computer-implemented method, such that the instructions thus executed will instantiate the methods specified in flowcharts and/or narrative descriptions of computer-implemented methods included in this document (collectively referred to as "the disclosed methods"). These computer-readable program instructions are stored in various types of computer-readable storage media, such as the cache 114B and the other storage media discussed below. The program instructions, and associated data, are accessed by the processor set 114 to control and direct the performance of the disclosed methods. In computing environment 100, at least some of the instructions for performing the disclosed methods may be stored in the dynamic modification of the evaluation of stability of edge-based communication network associated with code 120B in persistent storage 120.

The communication fabric 116 is the signal conduction path that allows the various components of computer 102 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

The volatile memory 118 is any type of volatile memory now known or to be developed in the future. Examples include dynamic type random access memory (RAM) or static type RAM. Typically, the volatile memory 118 is characterized by a random access, but this is not required unless affirmatively indicated. In the computer 102, the volatile memory 118 is located in a single package and is internal to computer 102, but alternatively or additionally, the volatile memory 118 may be distributed over multiple packages and/or located externally with respect to computer 102.

The persistent storage 120 is any form of non-volatile storage for computers that is now known or to be developed in the future. The non-volatility of this storage means that the stored data is maintained regardless of whether power is being supplied to computer 102 and/or directly to the persistent storage 120. The persistent storage 120 may be a read-only memory (ROM), but typically at least a portion of the persistent storage 120 allows writing of data, deletion of data, and re-writing of data. Some familiar forms of the persistent storage 120 include magnetic disks and solid-state storage devices. The operating system 120A may take several forms, such as various known proprietary operating systems or open-source Portable Operating System Interface-type operating systems that employ a kernel. The code included in the evaluation of stability of edge-based communication network associated with code 120B typically includes at least some of the computer code involved in performing the disclosed methods.

The peripheral device set 122 includes the set of peripheral devices of computer 102. Data communication connections between the peripheral devices and the other components of computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments of the disclosure, the UI device set 122A may include components such as a display screen, speaker, microphone, wearable devices (such as goggles and smartwatches), keyboard, mouse, printer, touchpad, game controllers, and haptic devices. The storage 122B is external storage, such as an external hard drive, or insertable storage, such as an SD card. The storage 122B may be persistent and/or volatile. In some embodiments of the disclosure, storage 122B may take the form of a quantum computing storage device for storing data in the form of qubits. In embodiments of the disclosure where computer 102 is required to have a large amount of storage (for example, where computer 102 locally stores and manages a large database) then this storage may be provided by peripheral storage devices designed for storing very large amounts of data, such as a storage area network (SAN) that is shared by multiple, geographically distributed computers. The IoT sensor set 122C is made up of sensors that may be used in Internet of Things applications. For example, one sensor may be a thermometer and another sensor may be a motion detector.

The network module 124 is the collection of computer software, hardware, and firmware that allows computer 102 to communicate with other computers through WAN 104. The network module 124 may include hardware, such as modems or Wi-Fi signal transceivers, software for packetizing and/or de-packetizing data for communication network transmission, and/or web browser software for communicating data over the internet. In some embodiments of the disclosure, network control functions, and network forwarding functions of the network module 124 are performed on the same physical hardware device. In various embodiments of the disclosure (for example, embodiments that utilize software-defined networking (SDN)), the control functions and the forwarding functions of the network module 124 are performed on physically separate devices, such that the control functions manage several different network hardware devices. Computer-readable program instructions for performing the disclosed methods may typically be downloaded to computer 102 from an external computer or external storage device through a network adapter card or network interface included in the network module 124.

The WAN 104 is any wide area network (for example, the internet) capable of communicating computer data over non-local distances by any technology for communicating computer data, now known or to be developed in the future. In some embodiments of the disclosure, the WAN 104 may be replaced and/or supplemented by local area networks (LANs) designed to communicate data between devices located in a local area, such as a Wi-Fi network. The WAN 104 and/or LANs typically include computer hardware such as copper transmission cables, optical transmission fibers, wireless transmission, routers, firewalls, switches, gateway computers, and edge servers.

The EUD 106 is any computer system that is used and controlled by an end user (for example, a customer of an enterprise that operates computer 102) and may take any of the forms discussed above in connection with computer 102. The EUD 106 typically receives helpful and useful data from the operations of computer 102. For example, in a hypothetical case where computer 102 is designed to provide a recommendation to an end user, this recommendation may typically be communicated from the network module 124 of computer 102 through WAN 104 to EUD 106. In this way, the EUD 106 may display, or otherwise present recommendations to an end user. In some embodiments of the disclosure, EUD 106 may be a client device, such as a thin client, heavy client, mainframe computer, desktop computer, and so on.

The remote server 108 is any computer system that serves at least some data and/or functionality to the computer 102. The remote server 108 may be controlled and used by the same entity that operates the computer 102. The remote server 108 represents the machines that collect and store helpful and useful data for use by other computers, such as the computer 102. For example, in a hypothetical case where the computer 102 is designed and programmed to provide a recommendation based on historical data, then this historical data may be provided to the computer 102 from the remote database 108A of the remote server 108.

The public cloud 110 is any computer system available for use by multiple entities that provides on-demand availability of computer system resources and/or other computer capabilities, especially data storage (cloud storage) and computing power, without direct active management by the user. Cloud computing typically leverages the sharing of resources to achieve coherence and economies of scale. The direct and active management of the computing resources of the public cloud 110 is performed by the computer hardware and/or software of the cloud orchestration module 110B. The computing resources provided by the public cloud 110 are typically implemented by virtual computing environments that run on various computers making up the computers of the host physical machine set 110C, which is the universe of physical computers in and/or available to the public cloud 110. The virtual computing environments (VCEs) typically take the form of virtual machines from the virtual machine set 110D and/or containers from the container set 110E. It is understood that these VCEs may be stored as images and may be transferred among and between the various physical machine hosts, either as images or after the instantiation of the VCE. The cloud orchestration module 110B manages the transfer and storage of images, deploys new instantiations of VCEs, and manages active instantiations of VCE deployments. The gateway 110A is the collection of computer software, hardware, and firmware that allows public cloud 110 to communicate through WAN 104.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system may utilize all resources of that computer, such as connected devices, files and folders, network shares, CPU power, and quantifiable hardware capabilities. However, programs running inside a container may only use the contents of the container and devices assigned to the container, a feature which is known as containerization.

The private cloud 112 is similar to public cloud 110, except that the computing resources are only available for use by a single enterprise. While the private cloud 112 is depicted as being in communication with the WAN 104, in various embodiments of the disclosure, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment of the disclosure, the public cloud 110 and the private cloud 112 are both part of a larger hybrid cloud.

Figure 2:
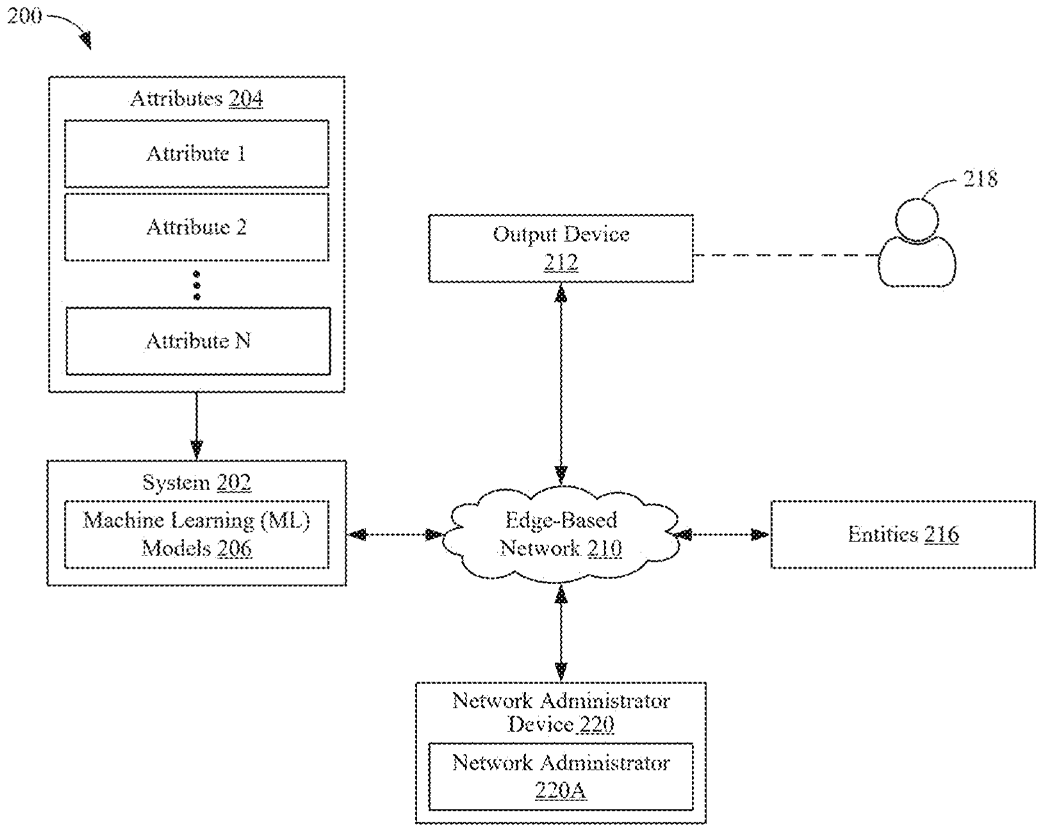
FIG. 2 is a diagram that illustrates an environment for evaluation of stability of edge-based communication networks, in accordance with an embodiment of the disclosure.

FIG. 2 is a diagram that illustrates an environment for evaluation of stability of edge-based communication networks, in accordance with an embodiment of the disclosure. FIG. 2 is explained in conjunction with elements from FIG. 1. With reference to FIG. 2, there is shown a diagram of a network environment 200. An edge-based network 210 may be communicatively coupled to a system 202, an output device 212 associated with a user 218, entities 216, and a network administrator device 220. The system 202 may be an exemplary embodiment of the computer 102 in FIG. 1.

The system 202 may include suitable logic, circuitry, interfaces, and/or code configured for monitoring and evaluating the stability of the edge-based network 210. The system 202 may be configured to collect the attributes 204 (Attribute 1, Attribute 2, . . . . Attribute N) associated with the edge-based network 210. The system 202 may be further configured to process the attributes 204 using the machine learning (ML) models 206, thereby enabling the analysis of data relevant to the edge-based network. The architectural structure of the edge-based network 210 may be parametrized and represented as a semantic graph of the edge-based network 210. Such a semantic graph may be stored by the system 202 or by a suitable storage medium accessible to the system 202. The system 202 may be configured to generate a partition model based on the semantic graph that incorporates the collected attributes. The partition model may evolve over time, allowing the system 202 to generate time-series data that reflects the dynamic states of the network. The system 202 may utilize advanced stability estimation techniques, such as the Lyapunov function and Lyapunov drift, to analyze this time-series data and predict potential areas responsible for instability within the edge-based network.

The system 202 may also be configured to identify entities 216 that contribute to instability issues, thereby allowing for proactive management of the network. Additionally, the system 202 may be configured to output relevant insights and alerts via the output device 212, enabling the user 218 to view these alerts and take appropriate actions. The role of user 218 may be that of a network technician, IT support staff, or system analyst responsible for monitoring alerts and insights provided by the system 202. This user 218 may interact directly with the output device 212 to view the alerts related to instability issues and may take immediate action, if needed. According to some example embodiments, the system 202 may be configured to automatically correct the instability caused by one or more entities without requiring third-party intervention while facilitating the communication of potential stability concerns to the network administrator 220A. The examples of the system 202 may include, but are not limited to, a server, a computing device, a virtual computing device, a mainframe machine, a computer workstation, a smartphone, a cellular phone, a mobile phone, a gaming device, or a consumer electronic (CE) device.

Each entity of the entities 216 (or causal entities) may refer to specific components or factors within the edge-based network 210 that influence its stability. The system 202 may be configured to identify and analyze these causal entities based on the attributes collected. Each entity of the entities 216 may be associated with particular behaviors or characteristics that contribute to either stable or unstable network conditions. By determining the relationships between these entities and the overall network performance, the system 202 may effectively isolate and address the entities leading to instability in the edge-based network 210. The entities 216 may include, but are not limited to, individual devices, regions of device clusters within the network experiencing high traffic, or specific satellite communications. The entities 216 may include a variety of factors, such as individual devices (e.g., routers, switches, and IoT sensors) that participate in data transmission, specific regions experiencing high data traffic, and satellite connections that provide critical communication links. For instance, an overloaded router may serve as a causal entity that contributes to network latency or instability. Other examples of entities 216 may include software components, such as network protocols and firmware versions. The system 202 may utilize machine learning algorithms to analyze patterns and correlations among these entities, enabling it to predict potential stability issues before they escalate into significant disruptions. By providing insights into the relationships and interactions among the entities 216, the system empowers network administrators to implement targeted interventions.

The output device 212 may encompass various hardware interfaces or systems through which the results and actionable insights generated by the system 202 are communicated to users (including network administrators and stakeholders) or may be automatically monitored by the system 202 itself. In this regard, the system 202 may be configured to present a range of outputs, including alerts, performance reports, visualizations, and analytical dashboards, all aimed at facilitating informed decision-making. Examples of the output device 212 may include, but are not limited to, a computer monitor or display screen providing real-time visualizations of network performance metrics, a mobile application on a smartphone or tablet that delivers notifications regarding network status and alerts, and a web-based dashboard accessible via a browser that aggregates and presents comprehensive reports on network stability and causal entities of the entities 216. Additionally, the output device 212 may support audio alerts, ensuring that critical notifications regarding potential instability are conveyed immediately, even in scenarios where visual monitoring is not possible. Moreover, the output device 212 may be designed to offer customizable settings, allowing users to tailor the frequency and type of alerts received based on their specific roles or responsibilities. For example, a network administrator may prioritize alerts related to critical network failures, while other users may be interested in performance trends over time. According to some example embodiments, the system 202 may undertake targeted repairs of the edge-based network 210 to correct the instability caused by one or more entities of the entities 216.

Attributes 204 encompasses a wide array of characteristics and metrics that describe the various components and conditions of the edge-based network 210. The system 202 may be configured to collect a diverse range of attributes, including but not limited to device identifiers, which may represent specific hardware elements such as routers, switches, or gateways that contribute to network connectivity, region identifiers, which may denote geographical areas with distinct traffic patterns or environmental factors affecting signal strength, and satellite identifiers, which may indicate the specific satellites used for communication and their operational status.

Additionally, attributes 204 may include latency metrics, which measure the time taken for data packets to travel between devices, bandwidth utilization, reflecting the percentage of available data transmission capacity currently in use and error rates, which quantify the frequency of transmission errors, providing insight into potential issues affecting data integrity and so on. By employing a semantic graph to represent these attributes, the system 202 may analyze complex relationships and dependencies among them, allowing for the identification of patterns that correlate with network stability or instability. Once collected, these attributes may be input into the system 202, which may organize and analyze the attributes to create a partition model using templates and a semantic graph of the edge-based network 210 that represents the network's operational state.

The network administrator device 220 may be associated with the network administrator 220A who may be an individual or an automated system. In this context, the network administrator 220A may interact with the edge-based network 210 through various interfaces, such as dashboards, control panels, or command-line tools, accessible via the output device 212. The network administrator device 220 receives real-time monitoring data from the system 202, which includes time-series data generated from network attributes such as devices, regions, and satellites. The time-series data captures the evolving state of the network over time, allowing the network administrator 220A to track trends, fluctuations, and potential instabilities. By analyzing these patterns, the network administrator 220A may proactively address emerging issues before they escalate into critical failures. The system 202 models the edge-based network 210 using a semantic graph, which organizes network attributes into meaningful relationships that depict the structure and behavior of the edge-based network 210. The network administrator 220A, via the network administrator device 220, interacts with the semantic graph to gain a deeper understanding of how different entities within the edge-based network 210 are interconnected. By analyzing the time-series data generated by the system, the network administrator device 220 may assess the change in the performance of the network over time.

Through the predictive capabilities of the system, the network administrator 220A may be informed of potential stability regions within the network. These stability regions represent areas of the network that are either stable or prone to instability, as detected by the system using techniques such as Lyapunov optimization. The network administrator 220A may take preventive measures, such as reallocating resources or rerouting traffic, to strengthen weaker areas of the network. The network administrator 220A may customize the alerts and reports generated by the system to focus on time-series data trends and stability predictions. These customized alerts may provide insights into specific stability regions, potential disruptions, or long-term performance metrics.

The edge-based network 210 may represent a distributed communication network, which allows for real-time processing of data closer to the source of data generation, such as devices or sensors located at the network edge. The edge-based network 210 may include various types of edge devices, such as smart devices, IoT (Internet of Things) devices, satellite communication systems, or regional servers, depending on the configuration of the network. The system 202 may be configured to monitor the stability and performance of the edge-based network 210 by processing data associated with attributes 204. The edge-based network 210 may be applied to mission-critical scenarios, such as autonomous vehicle networks, where fast and reliable data processing is required, or in smart grid networks, where real-time data processing is required to manage energy distribution efficiently. The system 202 may use the ML models 206 to predict instability within the edge-based network 210, identifying the entities 216 that may be contributing to such instability, and provide output via the output device 212 to the network administrator device 220. Furthermore, the system 202 may facilitate automatic corrective actions to restore stability in the network.

Figure 3:
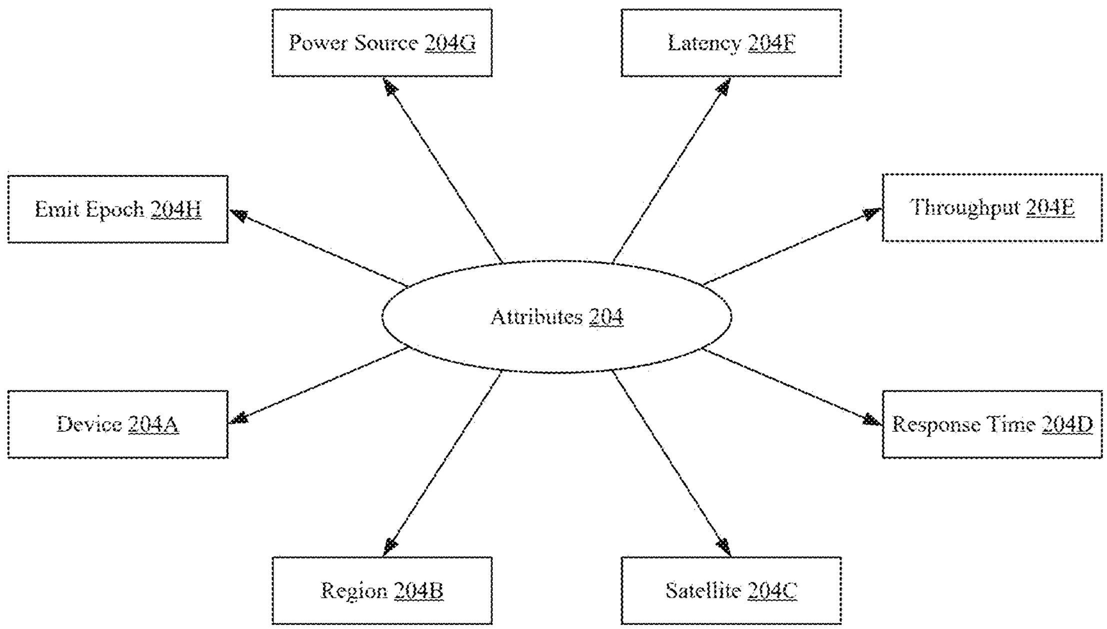
FIG. 3 is a diagram that illustrates attributes of entities associated with the edge-based communication networks, in accordance with an embodiment of the disclosure.

FIG. 3 is a diagram that illustrates the attributes of a plurality of entities for evaluation of stability in the edge-based networks, in accordance with an embodiment of the disclosure. The attributes 204 include device 204A, region 204B, satellite 204C, response time 204D, throughput 204E, latency 204F, power source 204G, and emitepoch 204H where each of these represents a specific attribute of an entity within the edge-based network 210. The device 204A refers to an identifier of a physical device that is coupled to the edge-based network. This may include a wide range of hardware components, such as servers, routers, switches, IoT (Internet of Things) sensors, mobile devices, drones, and any other electronic devices that are capable of transmitting and receiving data. The system 202 monitors the performance and behavior of each device to determine how its operation affects the network.

The region 204B corresponds to a geographic or logical division within the network. The network may span across multiple locations, each having distinct characteristics that may affect network performance. Each such location or area may have unique data for the region 204B. These locations or areas may range from different floors in a building, to urban vs. rural areas in a cellular network, or even different countries when dealing with global communication networks. For example, edge-based networks that operate across multiple countries may face issues due to different infrastructure quality, regional regulatory environments, or weather conditions. The system may detect region-specific issues, such as bandwidth limitations in rural areas, and alert network administrators.

The satellite 204C pertains to satellite communication systems integrated within the edge-based network. In networks that rely on satellites for data transmission, such as in remote locations or global communication systems. For example, a satellite providing internet access to rural areas may experience delays due to atmospheric interference, solar activity, or satellite alignment issues. The system 202 continuously monitors these satellites, assessing factors such as signal strength, orbital position, and transmission quality. If it detects anomalies in satellite communications, the system may predict potential disruptions, allowing operators to take preemptive measures, such as rerouting traffic through alternative satellite links.

The response time 204D refers to the time taken by a network entity to respond to a request or signal. For example, in an edge computing environment where real-time data processing is required, a high response time may lead to delays in decision-making processes or cause time-sensitive applications, such as autonomous vehicles or healthcare monitoring systems, to malfunction. The system 202 monitors response times across all entities within the network and flags instances where response times exceed acceptable thresholds. The throughput 204E measures the volume of data transmitted over the network within a given period of time. It reflects the overall capacity of the network to handle data traffic and indicates whether the network is being utilized. For example, in a smart city network, large volumes of sensor data are continuously transmitted to central systems for analysis. If the network throughput is insufficient to handle this volume of data, packets may be dropped, or data may be delayed, affecting the performance of the system. The system 202 tracks throughput levels and detects patterns of congestion or inefficiency. In scenarios where throughput decreases, such as during a surge in network usage or when specific devices are overloaded. The latency 204F refers to the delay between a data request and the response from the network. Low latency may be required in applications where real-time or near-real-time responses are required, such as in video conferencing, online gaming, or autonomous systems. Latency issues may be caused by long distances between devices and servers, slow processing times, or insufficient bandwidth.

The power source 204G pertains to the power supply of devices within the network. For example, in an edge-based IoT network deployed in a remote area, devices might rely on solar power, batteries, or other renewable sources. Power fluctuations or outages may cause these devices to go offline, disrupting network performance. The system 202 monitors the status of power sources and may detect potential failures or insufficient energy supply. For instance, if the power levels in a remote IoT device are running low, the system may notify the administrator, allowing for timely maintenance or battery replacement. The emitepoch 204H represents the specific time when data is emitted by a device or network entity. This timestamp is required for creating accurate time-series data. For example, in a network where multiple devices transmit data at regular intervals, discrepancies in timestamps may indicate synchronization issues. The system 202 uses attribute data of the emitepoch 204H to analyze trends and patterns over time, identify irregularities, and ensure that devices are functioning as expected within the expected timeframes. Additionally, other attributes that may be integrated into the attributes 204 of a plurality of entities may include signal strength, which indicates the quality of the connection between devices, network configuration, encompassing the specific settings and arrangements of devices within the network, and firmware version, which reflects the software state of devices and may impact their security. Other attributes may include bandwidth usage, which measures the amount of data transmitted over the network, device age, indicating how long a device has been in operation, and operating temperature, which may affect device performance and longevity, particularly in environments with extreme conditions, and so on.

Figure 4:
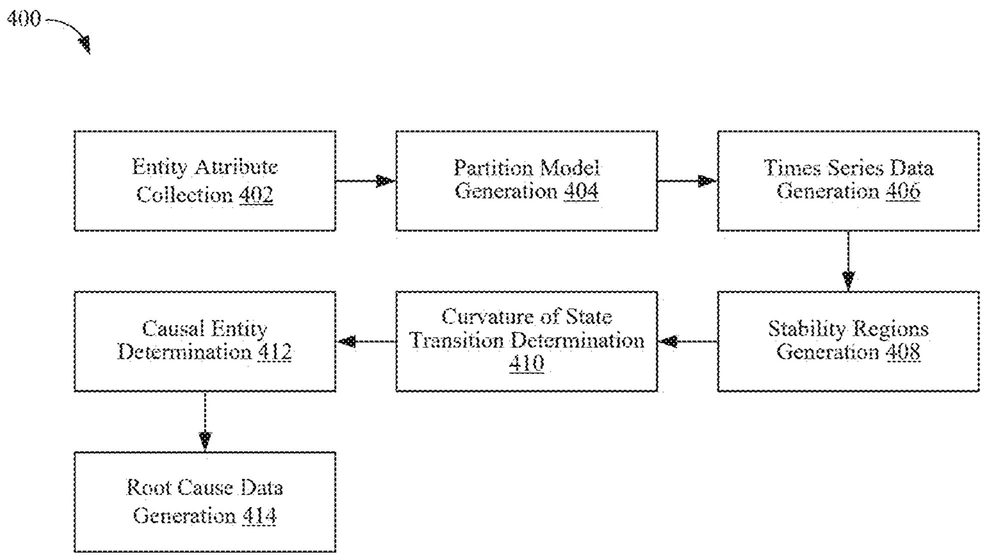
FIG. 4 is a diagram that illustrates a framework for evaluation of stability of edge-based communication networks, in accordance with an embodiment of the disclosure.

FIG. 4 is a diagram that illustrates a framework 400 for evaluation of stability of edge-based communication networks, in accordance with an embodiment of the disclosure. The framework 400 includes operations of entity attribute collection 402, partition model generation 404, time series data generation 406, stability regions generation 408, curvature of state transition determination 410, causal entity determination 412, and root cause data generation 414. The framework 400 begins with entity attribute collection 402, where the system collects various attributes associated with entities within the network. These entities may include devices (such as routers and sensors), geographical regions, or satellites, each possessing multiple attributes that may influence network performance. Key attributes may include signal strength, which indicates the quality of the connection; device type, identifying the nature of the device (e.g., IoT device or server) power source, specifying the energy source powering the device; latency, measuring communication delays; and firmware version, reflecting the device's software state.

Each entity may be characterized by a set of core attributes that influence network performance. These attributes may be collected through a suitable function such as has Data relationships to define entity attributes such as region, device, emitepoch and satellite associations. Specifically, relationships may be established similar to the following examples:

$$\begin{aligned} &\text{Identity } (j) \wedge hasData\,(j, m) \wedge \text{Region } (r) \\ &\text{Identity } (j) \wedge hasData\,(j, f) \wedge \text{Device } (d) \\ &\text{Identity } (j) \wedge hasData\,(j, d) \wedge EmitEpoch\,(e) \\ &\text{Identity } (j) \wedge hasData\,(j, h) \wedge \text{Satellite } (s) \\ &\Rightarrow \text{attributes } (r, d, e, s) \end{aligned} \tag{1}$$

where, for all the entities j that have associated data elements region 'r', emitepoch 'e', device 'd' and satellite 's' assigned via the hasData relationship, the reasoner automatically creates a relationship influences between <r, d, e, s>. These relational mappings may be integrated into knowledge graph, creating a structured view of entities and their associated data attributes.

Following attribute collection, the next operation involves partition model generation 404, where the system generates a partition model of the edge-based network based on the collected attributes. Partition model for the edge-based network may be generated based on a semantic graph of the edge-based network. The semantic graph includes a plurality of nodes that correspond to the plurality of attributes of the plurality of entities in the network. Based on a candidate entity's attributes and its connections within the semantic graph, the system constructs the partition model, which reflects the network's state as it changes over time. To generate a partition model, the entities within the semantic graph of the network may be clustered based on shared characteristics such as a common attribute like satellite connections or regional associations. A partition query may be run on the semantic graph to extract all the nodes that have a given attribute from Eq (1), for instance, for the satellite attribute the query may be formulated as:

$$P_{Satellite} = \text{Satellite } (s) \wedge \text{attributes}_{x=1}^{W}(s, x) \wedge \text{Data } (x) \tag{2}$$

Here, P depicts partition of the network.

This query returns for each satellite 's' all respective causal sources 'x'. The search query also returns property operational data about the attributes for that given entity up to a maximum depth W, given as the average width. Extending the logic of Eq (2) for all the attributes identified in Eq (1) gives:

$$P\,(t)_{Template} = \{\text{Template } (i) \wedge \text{attributes}_{x=1}^{W}(d, x) \wedge \text{Data}\,(x),\ \forall\, i \in \text{Template } (r, d, e, s)\} \tag{3}$$

Here, Template(i) is a set of all the templates that define the structure of the network such that it attributes the design of entity (from Eq (1)). Thus, Eq (3) automatically transforms the resultant set of semantic functionalities such as 'attributes' from Eq (1) into an identity semantic network (ISN) model, which is essentially a sub-graph or partition of the semantic graph.

In this regard, the partition model may be parameterized as a time-evolving function that defines a plurality of states of the edge-based network as a function of time. The semantic graph thus serves as the foundational structure for the partition model, enabling the program to simulate and analyze network behavior as a function of time. By translating each entity's interactions into a time-evolving model, the system can accurately monitor stability within the edge-based network. The semantic graph is needed in representing and organizing the relationships between various entities and attributes within an edge-based network of communication devices. This graph-based model acts as a structural blueprint for the network, capturing complex interdependencies between devices, components, and their attributes in a way that is both organized and interpretable by the system.

The semantic graph comprises nodes that correspond to the numerous attributes linked to each entity within the network.

The partition model represents the relationships among different entities and their attributes in a structured manner, parameterized as a time-evolving function. Such a model is capable of adapting to changes in the network over time, serving as a foundational framework for analyzing network dynamics and transitions. The model provides insights into how different entities interact and the impact of their attributes. Additionally, the model leverages templates that define the structural relationships between the various entities within the network. These templates serve as predefined blueprints. By utilizing these templates, the system generates the partition model.

The framework 400 also comprises time series data generation 406, where the system generates time series data that captures multiple states of the edge-based network over a defined time period. This time series data is generated based on the at least one partition model. The partition model evolves into a time series function $Q_i(t)$, with $\hat{b}_1(f)$ being the averaging function to gather the measure for the antipattern. In this regard, the timeseries function may be unfolded for a specified period of time to ascertain evolution of the states of the network over that time horizon. Thus, the time-series data records how the attributes of the entities change from a first time epoch to a second time epoch (different from the first time epoch), allowing for the identification of patterns and trends in network behavior. For instance, the system may track how latency varies throughout the day or how device performance fluctuates during peak usage hours.

Next, the framework 400 comprises stability regions generation 408, which uses the time-series data to identify stability regions within the network. These regions indicate areas of the network that are stable or unstable during specific time intervals, helping to visualize network performance under various conditions. Such areas of the network may be defined in terms of attributes and state parameters associated with entities of the network. According to some example embodiments, such areas may comprise one or a cluster of devices performing data communication within the network. By pinpointing these regions, network administrators may focus their efforts on areas requiring further attention or optimization. Stability regions may be assessed by examining time-series functions of attributes (r, d, e, s) and applying stability measures such as the Lyapunov function L ( ). This function be operated over the Q ( ) so that the scalar measurement of the estimation towards the antipattern may be obtained, as;

$$L(Q(t)) = \frac{1}{2}\left[Q(t)^2 + Q(t+1)^2\right] \tag{4}$$

The stability assessment with the scalar function such as Lyapunov function, determines whether attributes remain within acceptable limits across the network.

Following the identification of stability regions, the system determines the curvature of state transition determination 410. Rapid transitions can indicate stress or instability within network partitions characterized by specific attributes. The curvature of these transitions may be calculated as a Lyapunov drift, using the expression:

$$\Delta(Q(t)) \triangleq E\left[L(Q(t+1) - Q(t)) \mid Q(t)\right] \tag{5}$$

The curvature highlights regions with significant state shifts that may need optimization. The transition analysis may help administrators understand how fast or gradually the network moves between different operational states based on the attributes tracked in earlier stages.

The curvature of state transition for the network reflects how quickly the network transitions between different states based on the stability data generated in the preceding step. A rapid transition may indicate potential instability or stress within the network. By analyzing the curvature, administrators may predict the future states of the network. The framework further comprises causal entity determination 412, where the system identifies one or more causal entities that contribute to instability in the network. The identification of the one or more causal entities is based on the stability data and the curvature of state transition. A causal entity may be any device or a group of devices that negatively impact overall network performance. For example, if a device consistently shows high latency and low throughput, it may be flagged as a causal entity warranting further investigation.

The framework further comprises root cause data generation 414, which details the specific causal attributes of the identified entities and provides insight into the relationships contributing to the instability. This data serves as a valuable resource for understanding the root causes of network issues. For example, if a device's outdated firmware is identified as a contributing factor to instability, this information is documented as part of the root cause analysis. By systematically collecting data, generating models, and analyzing the relationships among various entities and their attributes, network administrators may identify potential issues before they escalate.

Figure 5A:
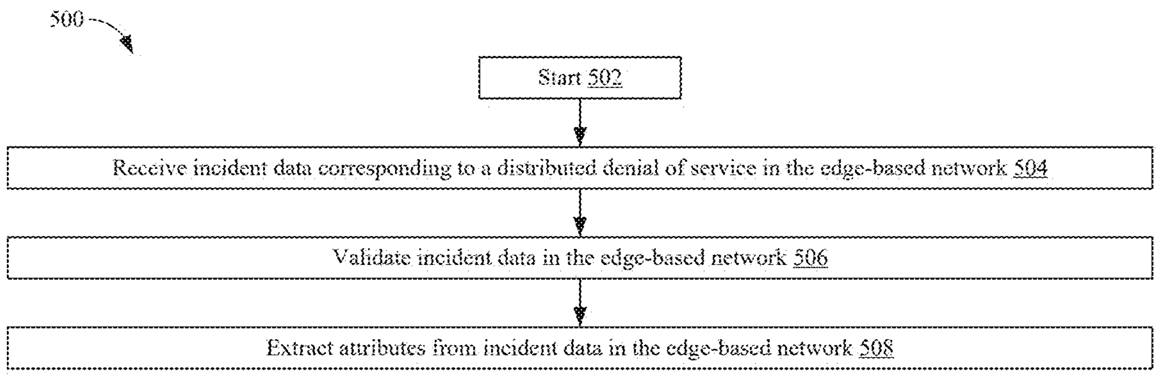
FIG. 5A is a flowchart that illustrates an exemplary method for processing incident data related to a distributed denial of service attack in the edge-based networks, in accordance with an embodiment of the disclosure.

FIG. 5A is a flowchart that illustrates an exemplary method for processing incident data related to a distributed denial of service attack in the edge-based networks, in accordance with an embodiment of the disclosure. The exemplary operations illustrated in the block diagram 500 may start at 502 and may be performed by any computing system, apparatus, or device, such as by the computer 102 of FIG. 1 or system 202 of FIG. 2. Although illustrated with discrete blocks, the exemplary operations associated with one or more blocks of the block diagram 500 may be divided into additional blocks, combined into fewer blocks, or eliminated, depending on the particular implementation. At 502, the process is initiated, where the system is invoked to address an incident in the edge-based network. The system 202 is designed to monitor and respond to various network anomalies, including distributed denial of service (DDoS) attacks. The edge-based network, characterized by a large number of decentralized devices such as IoT sensors, edge servers, and gateways, requires constant vigilance due to such attacks. Once the system detects a potential issue, it moves forward to gather relevant data for further analysis.

In this regard, at step 504, the system 202 may receive incident data corresponding to a distributed denial of service in the edge-based network. Here, the system 202 collects detailed incident data reflecting the nature and scale of the suspected DDoS attack. This data may include traffic logs, abnormal connection requests, excessive bandwidth usage, or system resource strain on edge devices. For example, the system may detect that a smart city's edge server is being flooded with malicious connection attempts or multiple IoT devices are receiving abnormally high requests that compromise their functionality. The incident data provides initial context for the potential attack and helps the system focus on the areas most affected. Following data collection, the method advances to step 506 where the system 202 validates incident data in the edge-based network, where the system verifies whether the gathered data indeed indicates a genuine DDoS attack. This validation step is required to prevent false positives or irrelevant actions based on benign spikes in network traffic. Using anomaly detection algorithms, traffic analysis, and machine learning models, the system compares current activity against historical traffic patterns and known attack behaviors. For example, if the traffic involves unusually high volumes of requests from geographically dispersed IP addresses targeting specific IoT nodes, the system confirms the likelihood of a distributed attack.

Upon validation of the incident data, the method proceeds to step 508 where the system 202 extracts attributes from incident data in the edge-based network. This stage involves identifying and isolating key attributes from the validated data, which provides deeper insights into the nature of the DDoS attack. These attributes might include source IP addresses, protocol types used, and the specific devices or regions targeted within the network. For example, the system might detect that a set of edge-based IoT devices running outdated firmware is the main target of the attack, or that a particular communication protocol is being exploited to overload the network. In addition to these core attributes, the system might also extract more granular details such as signal strength, network configuration settings, and firmware versions of the affected devices.

These attributes are relevant in an edge-based network, where devices often have varying specifications and capabilities, making them more vulnerable to certain types of attacks. For instance, if a subset of edge servers experiences a sudden drop in signal strength combined with abnormal traffic, this may indicate an attack designed to exploit communication weaknesses in those specific servers. By extracting and analyzing these attributes, the system may effectively profile the attack and identify the primary targets, attack vectors, and vulnerabilities in the edge-based network that are causing the instability.

Figure 5B:
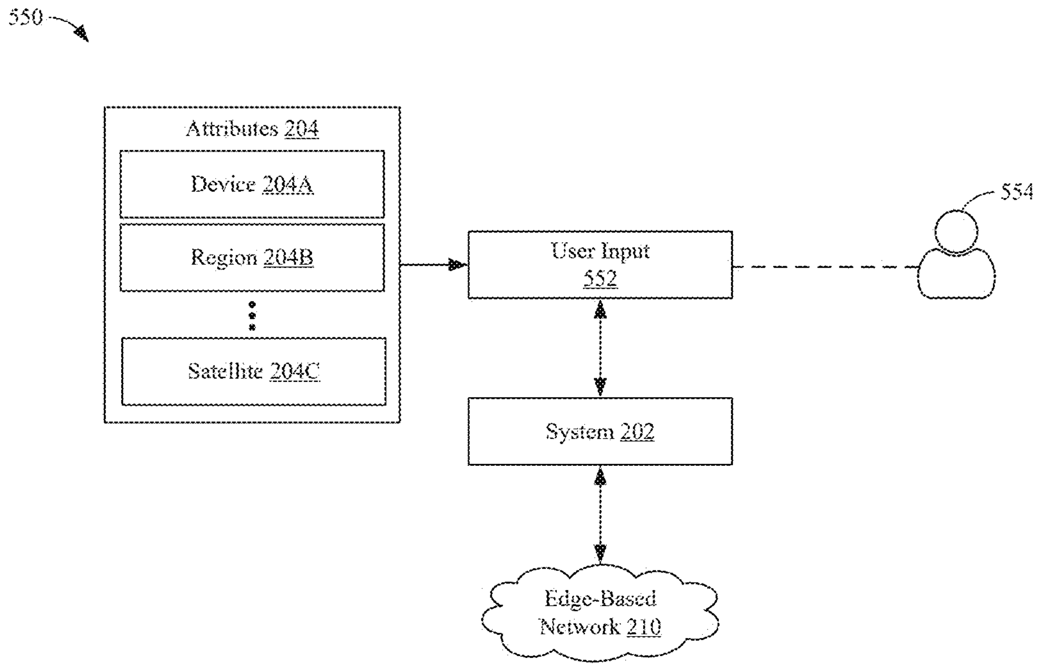
FIG. 5B is a diagram that illustrates an exemplary method involving user-provided inputs triggering a stability evaluation for an edge-based network, in accordance with an embodiment of the disclosure.

FIG. 5B is a diagram that illustrates an exemplary method involving user-provided input triggering a stability evaluation process in an edge-based network, in accordance with an embodiment of the disclosure. This diagram 550 illustrates a process where user 554 provides the attributes for the edge-based network 210 to the system 202 to find the instability in the edge-based network 210. The process begins with reception of the user input 552, where the user 554, such as a network administrator, provides the attributes 204 related to one or more entities in the edge-based network 210. These attributes 204 may include details such as device 204A, region 204B, satellite 204C, device IDs, signal strength, operational status, or other critical metrics related to device performance. For instance, if the device in question is a sensor, the user may input its current operational status and its geographical location. The user input 552 initiates the stability evaluation process in the edge-based network 210, providing the system 202 with required data points that form the basis of further analysis.

Once the attributes are provided, they are transmitted to the system 202 coupled to the edge-based network 210. The stability may be detected by the system 202 using predefined templates and advanced computational models, such as partition models and semantic graphs. The system processes the user-provided attributes and generates time-series data to reflect the evolving states of the network. The system evaluates the stability based on the time series data. This analysis may detect potential risks such as communication bottlenecks, DDoS attacks, or device failures that may threaten the network's stability. After processing the attributes and identifying potential instabilities, the system generates root cause data and targeted repair commands. The root cause data identifies the specific causes of instability within the network, such as a malfunctioning device or an abnormal traffic pattern. The root cause data may be rendered to the user 554, allowing them to understand the source of the instability and take the relevant corrective actions. For example, if a network router is found to be causing delays or packet loss, the system may recommend rebooting the router or reconfiguring its settings. Additionally, or alternately, the system 202 may execute the repair commands automatically to remedy the cause of instability in the network.

Figure 5C:
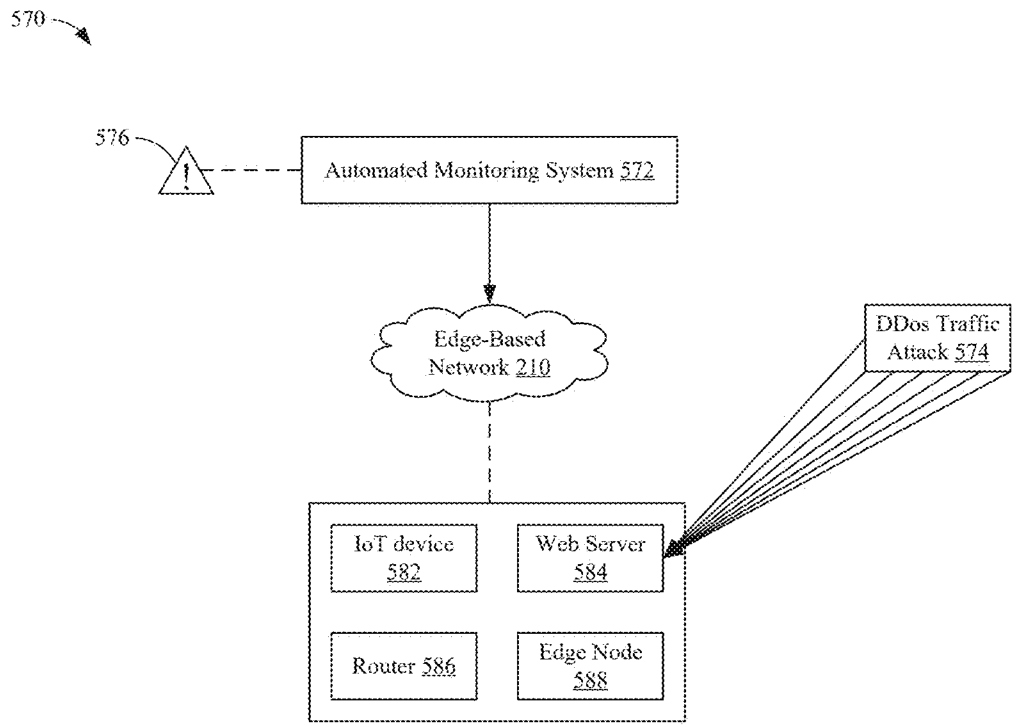
FIG. 5C is a diagram that illustrates an exemplary environment of an automated monitoring system during a distributed denial of service (DDoS) attack in an edge-based network, in accordance with an embodiment of the disclosure.

FIG. 5C is a diagram that illustrates an exemplary environment 570 of an automated monitoring system 572 during a distributed denial of service (DDoS) traffic attack 574 in an edge-based network 210, in accordance with an embodiment of the disclosure. The automated monitoring system 572 may continuously observe network traffic and performance metrics of the edge-based network 210. In this regard, the automated monitoring system 572 may be equipped with advanced algorithms tailored for detecting anomalies indicative of potential threats, such as distributed denial of service (DDoS) traffic attack 574. As the monitoring system 572 flags unusual traffic patterns, it highlights the incoming DDoS traffic attack. In this scenario, multiple sources may flood the edge-based network 210 with excessive data packets targeting specific devices such as one or more web servers in the edge-based network 210. The arrows representing the attack illustrate the nature of DDoS, where numerous external devices may collaborate to overwhelm a single target, disrupting normal operations. The automated monitoring system 572 may also be coupled to an alert generation system 576 that serves as a notification mechanism, promptly informing network administrators and/or the system 202 of detected anomalies or threats. When a potential DDoS attack is identified, the automated monitoring system 572 invokes the alert generation system 576 to trigger alerts, prompting immediate investigation and action. The automated monitoring system 572 may generate incident data corresponding to the DDoS attack and communicate the same to the system 202 for further analysis. This system 202 may deliver real-time notifications through various channels such as email, SMS, or dashboard alerts.

When a DDoS attack is detected, the system 202 may automatically reroute traffic to less affected servers or engage in traffic filtering to minimize the impact. The alert system may generate reports post-incident, analyzing the DDoS attack's impact on network performance and providing insights for future improvements. Then the automated monitoring system 572 automatically sends the data to the system 202 coupled to the edge-based network 210, to detect the instability during the DDoS traffic attack 574. The edge-based network 210 encompasses all connected devices involved in data processing and communication. This network handles data and gives a rapid response. The edge-based network 210 may include one or more IoT devices such as the IoT device 582, one or more web servers such as the web server 584, one or more routers such as the router 586, and one or more edge nodes such as the edge node 588. The IoT device 582 collects data from its environment and transmits it to other network components. For example, a smart thermostat might relay temperature readings to a router. The router 586 may serve as a traffic management component, directing data packets to their respective destinations. During a DDoS attack, the one or more routers handle increased traffic loads effectively.

The web server 584 hosts applications and serves content to users, and as such they are potential targets during a DDoS attack. Overwhelmed by the influx of malicious traffic, the web server may risk service disruptions. In addition, the edge node 588 performs localized data processing, enabling faster responses and reducing reliance on central servers. For instance, an edge node may analyze incoming data from multiple IoT devices in real time, facilitating quicker decision-making and operational efficiencies. It may be contemplated that the network may comprise various devices in addition or different from the ones shown in FIG. 5C. Examples of such devices include sensors, security cameras, smart appliances, and any other edge devices that communicate within the network.

The focus of the process described with reference to FIG. 5C extends beyond just responding to attacks, rather it also emphasizes the role of the automated monitoring system 572 in ensuring continuous network performance where the triggering of the incident data occurs. This system is designed to observe and analyze traffic patterns, device health, and overall network functionality, allowing for the early detection of potential issues before they escalate into significant threats. By maintaining constant vigilance, the automated monitoring system 572 performs identification of anomalies, such as DDoS attacks as well as routine performance evaluations and operational improvements. According to some example embodiments, the monitoring system 572 may be a part of the system 202 of FIG. 2.

Figure 6:
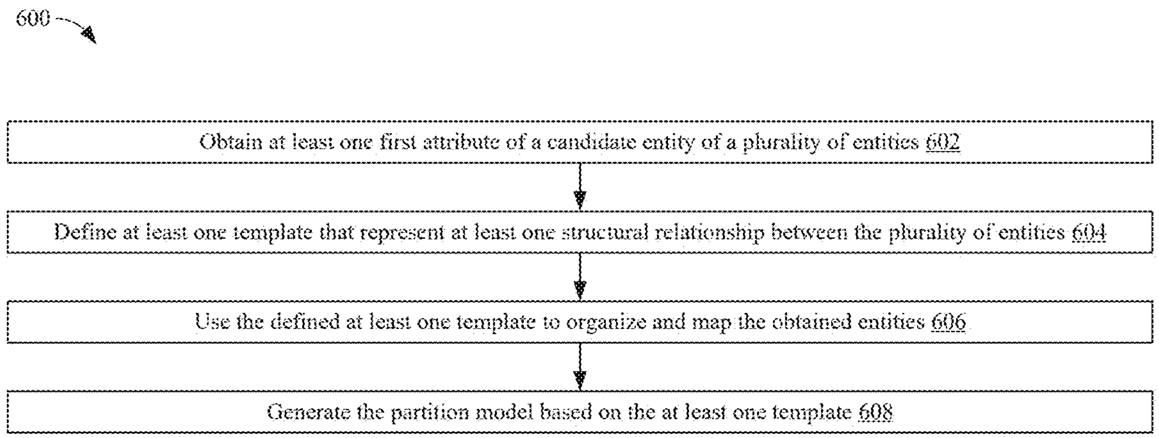
FIG. 6 is a flowchart that illustrates an exemplary method for generating a partition model using templates for an edge-based network, in accordance with an embodiment of the disclosure.

FIG. 6 is a flowchart that illustrates an exemplary method 600 for generation of a partition model using templates in the edge-based networks, in accordance with an embodiment of the disclosure. The exemplary method 600 comprises obtaining at 602, at least one first attribute of a candidate entity from a plurality of entities within an edge-based communication network. This involves collecting data points or characteristics that are associated with the selected entity. The at least one first attribute may include one or more identifiers such as device IDs, region designations, satellite associations, signal strength, network configuration, or even firmware versions of the candidate entity. The candidate entity may be any device, node, or communication unit within the edge-based network. Next, at 604 the exemplary method 600 proceeds to define at least one template that represents at least one structural relationship between the plurality of entities within the network. Templates may be predefined structural models or blueprints that describe how different entities are organized or interconnected in the network. These templates may represent configurations or relationships, such as devices belonging to a particular geographical region, satellite communication links, or hierarchical dependencies between different devices in the network. For example, a template may define the relationships between edge devices communicating with satellites or devices grouped based on the region they serve.

Once the at least one template is defined, it/they may be utilized to organize and map the obtained entities at 606. In this step, the collected attributes of the candidate entity are mapped onto the predefined templates. This allows the system to integrate the individual entities into a cohesive network model, ensuring that all relationships and dependencies are accurately represented. This step ensures that the obtained data about the candidate entity is structured and aligned with the broader network's architecture as defined by the templates. The exemplary method 600 further comprises generating, at 608, the partition model using the at least one template. The partition model is created by applying the defined template(s) and the organized entities, reflecting how the entities are grouped and interconnected within the network. The partition model evolves over time, providing insights into how the states of different entities and their interactions change. By incorporating time-evolving parameters, the partition model may capture the dynamic nature of the network, such as fluctuating signal strength or device mobility. Once the partition model is established, the system generates time-series data based on the partition model where the partition model is parametrized as a time-evolving function that defines states of the edge-based network as a function of time.

Figure 7:
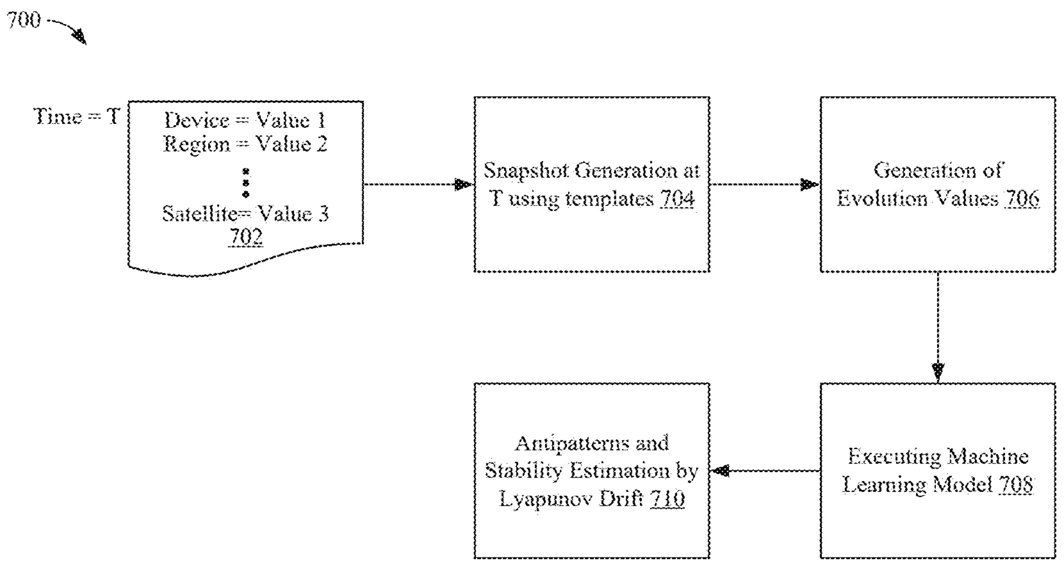
FIG. 7 is a diagram that illustrates a framework for monitoring and predicting the stability of edge-based communication networks, in accordance with an embodiment of the disclosure.

FIG. 7 is a diagram that illustrates a framework 700 for monitoring and predicting the stability of edge-based communication networks. The framework 700 includes attribute collection step 702 at a designated time T, snapshot generation step 704 at T using templates, generation of evolution values, executing machine learning model step 708, and antipatterns and stability estimation by Lyapunov Drift step 710. At time T, the system in the attribute collection step 702 collects key attributes from entities within the edge-based communication network in the manner described previously with reference to FIG. 4. For example, a device may report its signal strength, latency, and processing capability, while a region might provide information about traffic load or congestion levels. Similarly, a satellite may contribute data related to connection quality and resource utilization.

Attributes such as device, region, and satellite represent information points that are gathered to have a snapshot of the network at a particular time. For instance, the attribute device=value 1 may capture a device's operational status, such as value may be in numbers or indicate "active" or "inactive," while region=value 2 may reflect network congestion levels in a specific area, like "high congestion" or "low traffic." Similarly, the attribute satellite=value 3 may denote the strength of the satellite signal, with values such as "strong" or "weak." It is relevant to note that the attribute collection is not limited to the aforementioned attributes alone, rather it can encompass collecting values of other suitable attributes as well. Additional attributes may include without limitation-signal strength, power source, latency, throughput, network configuration, or even the firmware version of devices in the network. Once the network attributes are collected, the system proceeds to the snapshot generation step 704 to generate a snapshot of the network at T. This snapshot may be organized using predefined templates that represent structural relationships between the various entities. These snapshots capture the network's state at a specific time (T in this case), allowing the system to document the network's behavior.

After the snapshots are generated, the system transitions to step 706 to generate evolution values. At this stage, the collected data from previous time snapshots is analyzed to track changes over time. The system compares attribute values across multiple time points to determine the evolution of the network's state. For instance, if the device status changes from "active" to "inactive" between snapshots, or if signal strength deteriorates over a threshold period, this may be captured in the evolution analysis. The evolution values serve as indicators of how the network's state is shifting in time. The executing machine learning model step 708 involves executing the machine learning model. The evolution values and snapshots are fed into a machine learning (ML) model that has been trained to detect trends, outliers, and abnormal behavior within the edge-based network. The ML model is capable of analyzing vast amounts of timeseries data, identifying hidden correlations between different attributes, and flagging areas of concern. For example, the ML model may detect that a combination of decreasing signal strength, increased latency, and a specific firmware version often correlates with network instability.

Following this, the system performs antipatterns and stability estimation via Lyapunov Drift at the antipatterns and stability estimation by Lyapunov Drift step 710. The system applies scalar optimization techniques such as Lyapunov drift and Lyapunov function to assess the overall stability of the network. This approach employs a Lyapunov function-a nonnegative scalar measure of the network's multi-dimensional state. The Lyapunov function is defined such that it increases as the system approaches undesirable states, providing a quantifiable metric of stability. Control actions are then implemented to ensure that the Lyapunov function drifts in the negative direction towards zero. The Lyapunov drift analysis focuses on monitoring changes in the Lyapunov function over time. If the drift exceeds a certain threshold, it indicates an instability antipattern, serving as an early warning signal for potential issues. The analysis aims to stabilize network queues while optimizing performance objectives, such as minimizing average energy consumption or maximizing throughput. Techniques like the backpressure routing algorithm, also referred to as the max-weight algorithm, arise from minimizing the drift of a quadratic Lyapunov function.

The results from the Lyapunov drift analysis may be fed back into the ML model for further refinement, allowing the system to continuously learn and improve its predictive capabilities. Based on these findings, the system may generate actionable insights, which may be communicated to network administrators or used to automate corrective actions. For example, if a specific device or region is consistently contributing to instability, the system may recommend reconfiguring the device or optimizing the network routing for that region.

Figure 8:
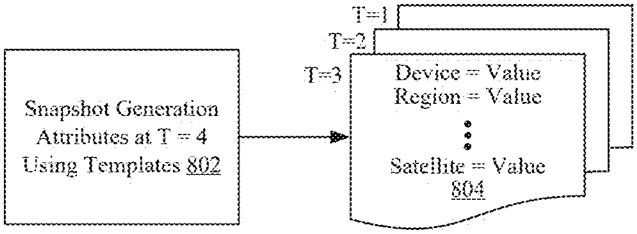
FIG. 8 is a diagram that illustrates schematics of generating snapshots at a time instance between two consecutive time epochs in the edge-based networks, in accordance with an embodiment of the disclosure.

FIG. 8 is a diagram that illustrates schematics of generating snapshots at a time instance between two consecutive time epochs in the edge-based networks, in accordance with an embodiment of the disclosure. Specifically, FIG. 8 is a diagram illustrating the snapshot generation 802 at an exemplary time T=4 for the edge-based network, in accordance with an embodiment of the disclosure. Generating a snapshot at T=4 involves collecting the attributes 804 related to devices and their performance. These attributes 804 are organized using predefined templates that standardize the data structure for effective monitoring and analysis. For instance, the snapshot at T=4 may include relevant information such as device identifiers, performance metrics, environmental conditions, and operational statuses. An example of this data may be Device ID: Device123, Region: Northwest, Signal Strength: −70 dBm, and Operational Status: Online. This snapshot not only reflects the current state of the device but also aids in assessing its performance against historical data. In addition to the attributes collected at T=4, the system aggregates data from T=3 or from T=2 or from T=1.

The previous snapshot provides context for understanding the current state, including values like Device ID: Device123, Region: Northwest, and Satellite: Satellite_A. Furthermore, historical snapshots from earlier time instances, T=1 and T=2, contribute valuable information. For example, at T=1, the data might show Device ID: Device123, Region: Northwest, and a Signal Strength of −90 dBm, indicating connectivity issues. By T=2, if the Signal Strength improved to −75 dBm, it reflects a recovery in network conditions. The accumulation of data from previous time instances allows for extensive analysis and the identification of trends. By examining the evolution of device performance, network operators may pinpoint patterns, monitor stability, and address potential issues. For instance, if a device consistently shows declining signal strength over multiple snapshots, operators may investigate possible causes, such as environmental factors or hardware malfunctions, to implement corrective actions. To effectively analyze the state of the network at time T=4, it is required to capture snapshots of all previous time instances, specifically T=1, T=2, and T=3. For example, to analyze the network at T=5, the snapshots from T=1, T=2, T=3, and T=4 may be required.

Figure 9:
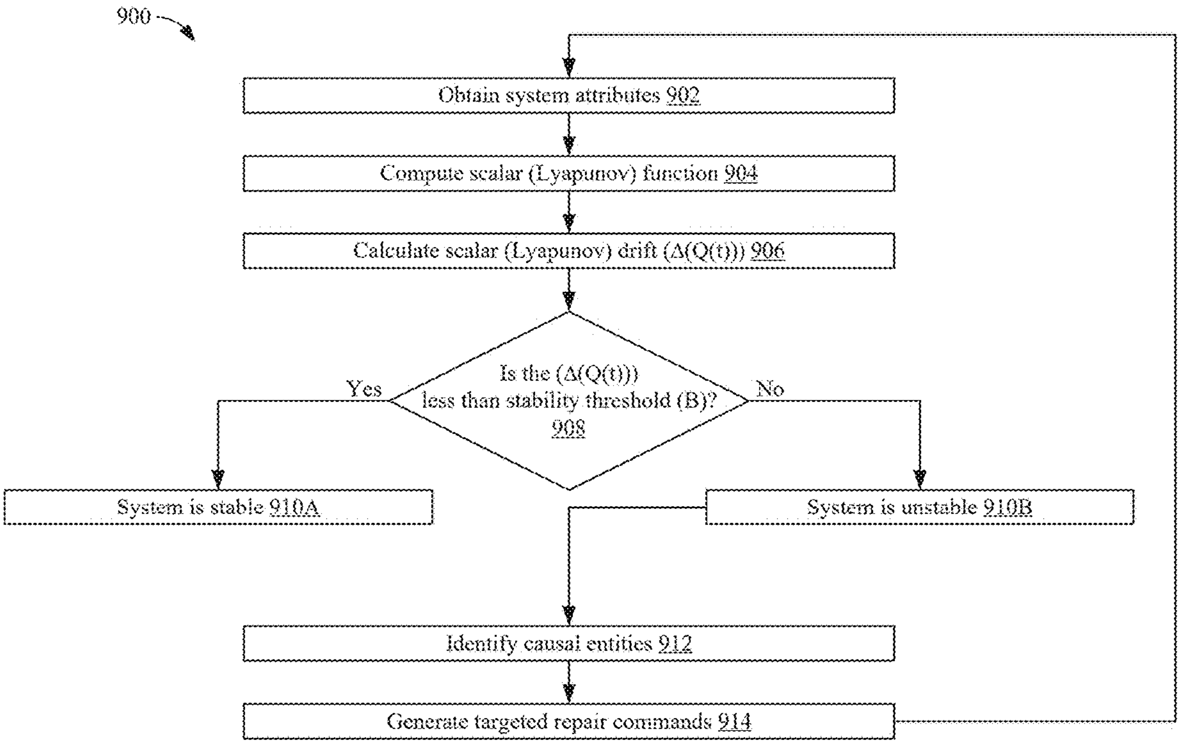
FIG. 9 is a flowchart that illustrates an exemplary process for detecting instability in an edge-based network using Lyapunov drift, in accordance with an embodiment of the disclosure.

FIG. 9 is a flowchart that illustrates an exemplary process 900 for detecting instability in an edge-based network using Lyapunov drift, in accordance with an embodiment of the disclosure. The process 900 includes obtaining at step 902, various system attributes that represent the current state of the network. These attributes may include device identifiers, signal strengths, device configurations, environmental conditions, and operational statuses associated with entities within the edge-based network. Throughout the stability analysis process, several intermediary operations provide the effective evaluation of system stability. These may include the generation of partition models that define the organization of entities, the generation of time-series data that track system behavior over time, and the development of semantic graphs that illustrate the relationships between various system attributes. Moreover, the generation of stability regions helps in understanding the operational thresholds within the network.

Once the system attributes are obtained, the process proceeds to step 904 to compute the scalar Lyapunov function. The Lyapunov function is operated on the time evolving partition of the network. The Lyapunov function is a mathematical representation that helps evaluate the stability of a dynamic system. Lyapunov function is used optimally to control a dynamical system. These functions are used extensively in control theory to ensure different forms of system stability. The state of a system at a particular time is often described by a multi-dimensional vector. A Lyapunov function is a non-negative scalar measure of this multi-dimensional state. Typically, the function is defined to grow large when the system moves towards undesirable states. System stability is achieved by taking control actions that make the Lyapunov function drift in the negative direction towards zero. In the context of edge-based networks, the Lyapunov function may represent energy levels, performance metrics, or any other system characteristic that may indicate stability. Next, the system, at step 906, calculates the scalar Lyapunov drift, denoted as $\Delta(Q(t))$. The Lyapunov drift represents the change in the Lyapunov function over time and is calculated as the difference between the Lyapunov function evaluated at successive time instances, typically expressed as $\Delta(Q(t)) \triangleq EL(Q(t+1)-Q(t))|Q(t)$.

This Lyapunov drift is central to the study of optimal control in queueing networks. A typical goal is to stabilize all network queues while optimizing some performance objective, such as minimizing average energy or maximizing average throughput. Minimizing the drift of a quadratic Lyapunov function leads to the backpressure routing algorithm for network stability, also called the max-weight algorithm. Adding a weighted penalty term to the Lyapunov drift and minimizing the sum leads to the drift-plus-penalty algorithm for joint network stability and penalty minimization. The drift-plus-penalty procedure may also be used to compute solutions to convex programs and linear programs. The calculated drift $\Delta(Q(t))$ is then compared at step 908, against a predetermined stability threshold B. The comparison at step 908 may involve checking if the Lyapunov drift is less than the stability threshold B to determine the stability of the system. If the Lyapunov drift is less than the stability threshold (i.e., $\Delta(Q(t))<B$), the system is considered stable at step 910A and the process may be terminated or alternately, the control of steps may be passed to step 902 where attributes of another entity in the network system may be selected. Conversely, if the Lyapunov drift is not less than the stability threshold (i.e., $\Delta(Q(t))>B$), the system is classified as unstable at step 910B, and the control of steps may be passed to step 912.

If the network system is found to be unstable, the causal entities contributing to this instability are identified at step 912. This may include analyzing the collected system attributes, partition models, and any relevant time-series data to pinpoint specific devices, traits, or factors that are negatively impacting network stability. Finally, based on the causal entities identified at step 912, the system generates targeted repair commands at step 914. The targeted repair commands are aimed at mitigating the issues and restoring stability. These commands may include one or more of adjustments to device configurations, network rerouting, or firmware updates. These commands may be suitably executed by the system 202 or another device, as the case may be. After generating these commands, the process moves to step 902 where a new round of data collection at step 902 is initiated and the other steps 904-914 are repeated. This iterative loop enables continuous monitoring and adaptation of the system, ensuring that any changes made are effectively evaluated in subsequent analyses. By maintaining this cycle, the system may respond dynamically to evolving conditions.

Figure 10:
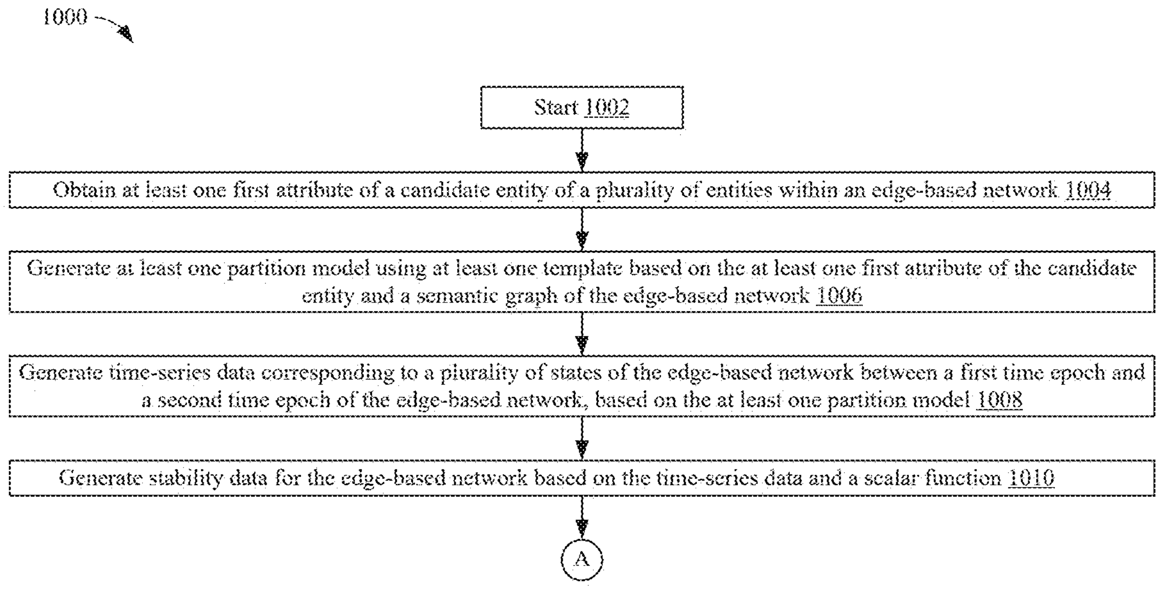
FIGS. 10 and 11 collectively is a flowchart that illustrates an exemplary method for evaluation of stability of edge-based communication networks, in accordance with an embodiment of the disclosure.
Figure 11:
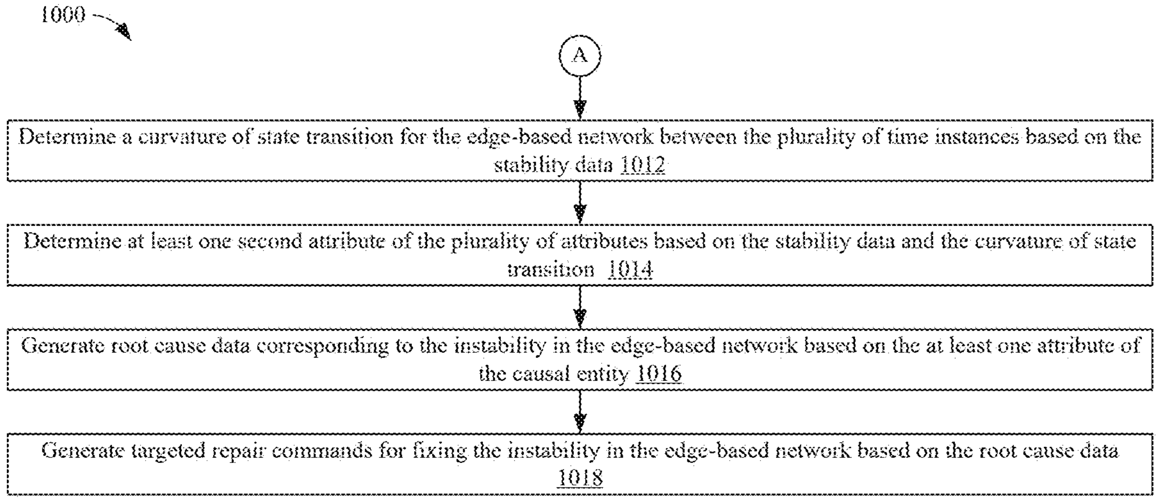

FIGS. 10 and 11 collectively show a flowchart that illustrates an exemplary method for evaluation of stability of edge-based communication networks, in accordance with an embodiment of the disclosure. FIGS. 10 and 11 are explained in conjunction with elements from FIG. 1, FIG. 2, FIG. 3, FIG. 4, FIG. 5, FIG. 6, FIG. 7 and FIG. 8. With reference to FIGS. 10 and 11, there is shown a flowchart 1000. The operations of the exemplary method may be executed by any computing system, for example, by the computer 102 of FIG. 1 or the system 202 of FIG. 2. The operations of the flowchart 1000 may start at 1002. This flowchart includes the whole process explaining how the identity semantic network (ISN) model works. The process starts by obtaining, at step 1004, at least one first attribute of a candidate entity within the network. This candidate entity may be any device, such as a temperature sensor, a network router, or an IoT device. The at least one first attribute may include at least one of identifiers such as device IDs, signal strength, battery level, or operational status of devices within the network. These attributes include various network-related parameters such as device identification numbers, geographic locations, or satellite connections. For instance, the system may gather data like Device ID=12345, Region=North America, Satellite=GEO-1, and Power Source=Solar, providing a comprehensive view of the device's operational status and the environmental context it operates in.

At step 1006, the method comprises generating at least one partition model of the network using at least one predefined template. This partition model is generated based on the collected at least one attribute of the candidate entity and a semantic graph of the edge-based network, which represents relationships between entities and their attributes. The model reflects the structural organization of the network, allowing the system to map how various entities interact with one another. The at least one predefined template serves as blueprints that categorize devices based on specific criteria, such as geographical locations, communication protocols, or functional roles within the network. For example, a template may organize temperature sensors into clusters based on their deployment regions (e.g., North Zone, South Zone) or the type of communication they utilize (e.g., Wi-Fi, Zigbee). The at least one partition model may be expressed as a time-evolving function of states of the network. In this regard, such a time-evolving function may define a plurality of states of the edge-based network as a function of time.

Following this, at step 1008 the method comprises generating time-series data corresponding to a plurality of states of the edge-based network, spanning between a first time epoch and a second time epoch of the edge-based network. The time-series data is generated based on the at least one partition model generated at step 1006 for example in the manner described with reference to FIG. 4. The time-series data provides a chronological representation of how an entity's attributes evolve over time, reflecting the dynamic nature of the network. For instance, the system may track how a temperature sensor's readings fluctuate every minute, showing whether the device is operating within normal thresholds or if it's experiencing irregularities. The time-series data may correspond to a plurality of states of the network that the network transitions into during two successive or arbitrary time epochs of the network. At step 1010, the method further comprises generating the stability data for the edge-based network based on the time-series data and a scalar function. The stability data indicates at least one scalar measurement of stability antipattern for the edge-based network. The at least one scalar measurement may correspond to at least one solution of an optimization problem (such as the one described with reference to Eq. 4) for at least one time instance of the plurality of time instances between a first time epoch and a second time epoch. Each state of the plurality of states of the network between which the network transitions during two time epochs such as the first time epoch and the second time epoch, corresponds to a respective time instance of a plurality of time instances between the first time epoch and the second time epoch.

Next, at step 1012, the method comprises determining a curvature of state transitions for the edge-based network between the plurality of time instances between the first time epoch and the second time epoch, based on the stability data generated at step 1010. This step analyzes how the network transitions from one operational state to another over time, focusing on changes in stability. A steep curvature may suggest rapid fluctuations or instability, while a more gradual slope might indicate that the network remains stable over a longer period. For example, if the curvature reflects sudden drops in signal strength in certain devices, network operators may be alerted to investigate potential hardware or environmental issues. In this regard, the system determines a scalar drift of evolution within the at least one partition model over time. This drift refers to how the network entities interactions change as the system evolves. The at least one partition model, owing to its time evolving nature, evolves in time leading to the states of entities encompassed by the partition model transitioning in between a plurality of stability regions indicated by the stability data. The scalar drift captures the curvature of this state transition. The scalar drift captures how different entities, such as devices or communication links, transition between various stability regions. For instance, if new IoT devices are added to the network or if some devices fail, the partition model's drift may reflect these changes.

The method further comprises, at step 1014, determining at least one second attribute from the attributes of all entities within the network that has a causal relationship with the instability in the network, based on the calculated curvature of state transition and the stability data. The at least one second attribute may correspond to a factor or a device contributing to network instability. For example, if a router consistently experiences high latency or a device exhibits erratic power consumption, the system may flag these attributes as potential causes of instability. Identifying the at least one second attribute helps narrow down the root causes of network performance issues, guiding network administrators toward corrective actions.

At step 1016, the method comprises generating root cause data corresponding to the instability detected within the edge-based network. The root cause data is generated based on the at least one second attribute determined in the preceding step 1014, thereby allowing network operators to understand the exact reasons for performance degradation or failures. For instance, the system may determine that a specific satellite link is underperforming due to interference, or a device's signal strength is weak due to faulty hardware. This data is utilized for informing targeted interventions, such as replacing faulty devices, adjusting configurations, or reassigning resources to mitigate instability. After generating the root cause data corresponding to instability in the edge-based network, the method proceeds to step 1018 to generate commands for taking proactive corrective actions to resolve the instability in the network. Towards this end, the method comprises at step 1018 generating targeted repair commands based on the root cause data. The system, having already identified the causal entity or entities contributing to the instability, now formulates a set of specific, actionable repair commands. These commands are designed to address the precise issues uncovered during the stability analysis process.

For example, if the root cause data reveals that a device, such as a router, is malfunctioning due to outdated firmware or improper configuration, the system may generate a repair command to update the firmware or reset the configuration to optimal settings. Examples of targeted repair commands in an edge-based network include actions such as device reconfiguration, where the system automatically adjusts the settings of a misconfigured network device, like a router or IoT sensor, to restore optimal performance. Another example is issuing a firmware update for devices identified as running outdated software, ensuring they operate with the latest security patches and performance enhancements. Load balancing adjustments may also be triggered to redistribute network traffic when congestion is detected, helping to alleviate bottlenecks. In this way, various example embodiments of the present disclosure lead to technical improvements in terms of detection and correction of network instability.

Figure 12:
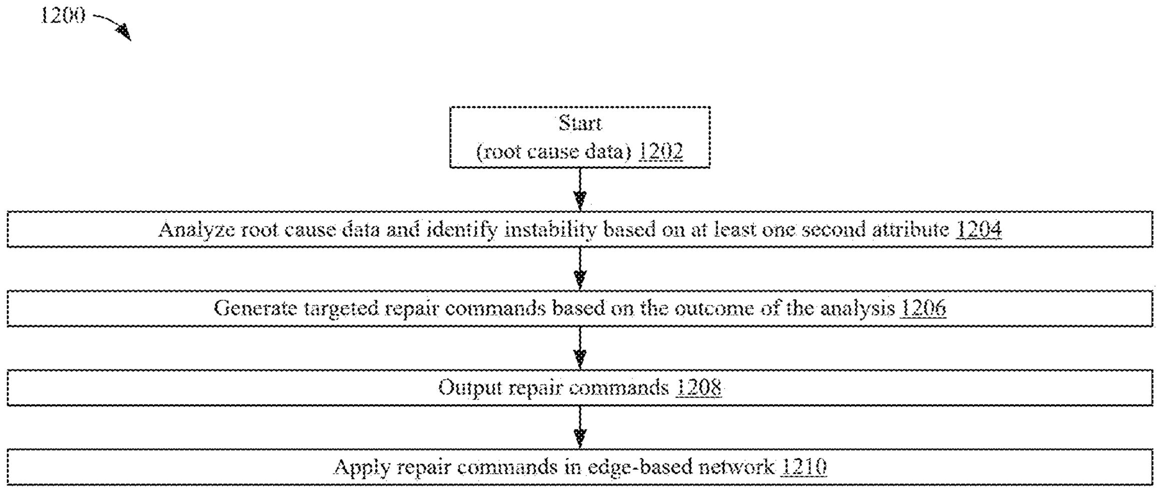
FIG. 12 is a flowchart that illustrates a method for generating targeted repair commands based on root cause data for edge-based networks, in accordance with an embodiment of the disclosure.

FIG. 12 is a flowchart that illustrates a method 1200 for generating targeted repair commands based on root cause data for edge-based networks, in accordance with an embodiment of the disclosure. The method 1200 starts at step 1202 with acquiring root cause data, where the system has previously identified the underlying factors contributing to instability within the edge-based network. It may be contemplated that one or more pre-processing steps may be performed by the system to prepare for the stability analysis of the edge-based network such as data collection of attributes, generation of partition model, time series data, semantic graph and determining stability regions and second attribute. Once the root cause data is available at step 1202, the system proceeds to step 1204 to analyze root cause data and identify instability based on the at least one second attribute indicated in the root cause data. This analysis focuses on identifying the specific entity or entities responsible for the network instability based on the second attribute, which may include device performance metrics, geographical location, communication protocols, or signal strength. In this regard, at step 1204, the system may utilize at least one machine learning algorithm that sifts through logs and historical performance data to pinpoint the exact cause of instability.

For example, if the at least one second attribute is related to signal strength, the analysis may reveal that a specific satellite connection is causing instability due to weak signals. Alternatively, if the issue pertains to device configuration, the analysis may identify that a set of routers is misconfigured, leading to routing loops that degrade overall network performance. After the instability is identified, the system generates at step 1206, targeted repair commands based on the outcome of the analysis. For example, if an instability due to an entity is identified at step 1204, the system may generate at least one targeted repair command to rectify the root cause of the identified instability. These commands are tailored to address the specific issues uncovered in the previous step, ensuring that the corrective actions are precise and effective. Examples of targeted repair commands may include configuring network devices such as routers or switches that are misconfigured to optimize routing paths, issuing firmware updates to devices experiencing software-related bugs, restarting or resetting malfunctioning devices to restore functionality in cases where software crashes or hardware faults are detected.

Once the repair commands are generated, the system proceeds to output these commands at step 1208. This step involves sending the generated repair commands to the appropriate devices or entities within the edge-based network. The system may communicate with the affected devices, either through a centralized server or via direct connections to the edge nodes or may give alerts to the network administrator or user about the casual entities. This ensures that the commands are received and applied promptly to prevent further degradation of the network's performance. For example, if a router is identified as the cause of a communication bottleneck, the repair command may be sent to adjust its configuration or update its firmware. If a satellite link is found to be unstable, the output command may instruct the rerouting of traffic through an alternative link. Finally, the repair commands are applied at step 1210 in the edge-based network. The system monitors the network as the commands are executed, ensuring that the devices respond correctly, and the instability is resolved. This may involve direct reconfiguration of hardware, software patches, or firmware updates that are automatically implemented by the affected devices. For instance, once a malfunctioning router is reconfigured or a device is updated with a firmware patch, the system will check for improvements in network performance by analyzing real-time metrics like signal strength, latency, and packet transmission rates. The system may continue to monitor these metrics post-repair to confirm that the instability has been successfully mitigated.

The descriptions of the various embodiments of the disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

obtaining, by a computer, at least one first attribute of a plurality of attributes, wherein each attribute of the plurality of attributes is associated with an entity of a plurality of entities within an edge-based network of communication devices, and wherein the at least one first attribute is associated with a candidate entity of the plurality of entities;

generating, by the computer, at least one partition model of the edge-based network based on the at least one first attribute of the candidate entity and a semantic graph of the edge-based network, wherein the semantic graph includes a plurality of nodes that correspond to the plurality of attributes, and wherein the at least one partition model is parameterized as a time-evolving function that defines a plurality of first states of the edge-based network as a function of time;

generating, by the computer, time-series data corresponding to a plurality of second states of the plurality of first states of the edge-based network between a first time epoch and a second time epoch of the edge-based network, based on the at least one partition model, wherein each state of the plurality of second states corresponds to a respective time instance of a plurality of time instances between the first time epoch and the second time epoch;

generating, by the computer, stability data for the edge-based network, based on the time-series data and a scalar function, wherein the stability data indicates at least one scalar measurement of stability antipattern for the edge-based network, and wherein the at least one scalar measurement corresponds to at least one solution of an optimization problem for at least one time instance of the plurality of time instances between the first time epoch and the second time epoch;

determining, by the computer, a curvature of a state transition for the edge-based network between the plurality of time instances, based on the stability data, wherein the at least one solution of the optimization problem defines the state transition for the edge-based network;

determining, by the computer, at least one second attribute of the plurality of attributes based on the stability data and the curvature of the state transition, wherein the at least one second attribute is associated with a causal entity of the plurality of entities that contributes to instability in the edge-based network; and generating, by the computer, root cause data corresponding to the instability in the edge-based network, based on the at least one second attribute of the causal entity.

2. The computer-implemented method of claim 1, further comprising:

querying the semantic graph based on the at least one first attribute of the candidate entity; and extracting at least one node of the plurality of nodes, based on the querying of the semantic graph, wherein the at least one node corresponds to the at least one first attribute of the candidate entity.

3. The computer-implemented method of claim 1, wherein the plurality of attributes comprises a region identifier associated with each entity of the plurality of entities, a device identifier associated with each entity of the plurality of entities, a time epoch for emitting data for each entity of the plurality of entities, and a satellite identifier associated with each entity of the plurality of entities.

4. The computer-implemented method of claim 1, further comprising:

receiving, by the computer, incident data corresponding to a distributed denial of service in the edge-based network; and extracting, by the computer, the at least one first attribute of the candidate entity, based on the incident data.

5. The computer-implemented method of claim 1, further comprising generating the at least one partition model of the edge-based network, based on at least one template that defines at least one structural relationship between the plurality of entities.

6. The computer-implemented method of claim 1, wherein the scalar function is a Lyapunov function, and the curvature of the state transition corresponds to Lyapunov drift.

7. The computer-implemented method of claim 1, wherein the root cause data includes the at least one second attribute of the causal entity and causal relationship information defining a causal relationship between the causal entity and the instability in the edge-based network.

8. The computer-implemented method of claim 1, further comprising generating, targeted repair commands for fixing the instability in the edge-based network, based on the root cause data.

9. A computer system, comprising:

a processor set;

one or more computer-readable storage media; and program instructions stored on the one or more computer-readable storage media, the program instructions executable by the processor set to cause the processor set to:

obtain at least one first attribute of a plurality of attributes, wherein each attribute of the plurality of attributes is associated with an entity of a plurality of entities within an edge-based network of communication devices, and wherein the at least one first attribute is associated with a candidate entity of the plurality of entities;

generate at least one partition model of the edge-based network based on the at least one first attribute of the candidate entity and a semantic graph of the edge-based network, wherein the semantic graph comprises a plurality of nodes that correspond to the plurality of attributes, and wherein the at least one partition model is parameterized as a time-evolving function that defines a plurality of first states of the edge-based network as a function of time;

generate time-series data, corresponding to a plurality of second states of the plurality of first states of the edge-based network between a first time epoch and a second time epoch of the edge-based network, based on the at least one partition model, wherein each state of the plurality of second states corresponds to a respective time instance of a plurality of time instances between the first time epoch and the second time epoch;

generate stability data for the edge-based network, based on the time-series data and a scalar function, wherein the stability data indicates at least one scalar measurement of stability antipattern for the edge-based network, and wherein the at least one scalar measurement corresponds to at least one solution of an optimization problem for at least one time instance of the plurality of time instances between the first time epoch and the second time epoch;

determine a curvature of a state transition for the edge-based network between the plurality of time instances, based on the stability data, wherein the at least one solution of the optimization problem defines the state transition for the edge-based network;

determine at least one second attribute of the plurality of attributes, based on the stability data and the curvature of the state transition, wherein the at least one second attribute is associated with a causal entity of the plurality of entities that contributes to instability in the edge-based network; and generate, root cause data corresponding to the instability in the edge-based network, based on the at least one second attribute of the causal entity.

10. The computer system of claim 9, wherein the program instructions further cause the processor set to:

query the semantic graph based on the at least one first attribute of the candidate entity; and extract at least one node of the plurality of nodes, based on the query of the semantic graph, wherein the at least one node corresponds to the at least one first attribute of the candidate entity.

11. The computer system of claim 9, wherein the plurality of attributes comprises a region identifier associated with each entity of the plurality of entities, a device identifier associated with each entity of the plurality of entities, a time epoch for emitting data for each entity of the plurality of entities, and a satellite identifier associated with each entity of the plurality of entities.

12. The computer system of claim 9, further comprising an interface configured to receive incident data corresponding to a distributed denial of service in the edge-based network, and wherein the program instructions further cause the processor set to:

obtain the at least one first attribute of the candidate entity, based on the incident data.

13. The computer system of claim 9, wherein the program instructions further cause the processor set to generate the at least one partition model of the edge-based network based on at least one template that defines at least one structural relationship between the plurality of entities.

14. The computer system of claim 9, wherein the scalar function is a Lyapunov function, and the curvature of the state transition corresponds to Lyapunov drift.

15. The computer system of claim 9, wherein the root cause data includes the at least one second attribute of the causal entity and causal relationship information, wherein the causal relationship information defines a causal relationship between the causal entity and the instability in the edge-based network.

16. The computer system of claim 9, wherein the program instructions further cause the processor set to generate, targeted repair commands for fixing the instability in the edge-based network, based on the root cause data.

17. A computer-program product for generating root cause data of instability in an edge-based network of communication devices, the computer-program product comprising:

one or more computer-readable storage media; and program instructions stored on the one or more computer-readable storage media to perform operations comprising:

obtaining at least one first attribute of a plurality of attributes, wherein each attribute of the plurality of attributes is associated with an entity of a plurality of entities within the edge-based network, and wherein the at least one first attribute is associated with a candidate entity of the plurality of entities;

generating at least one partition model of the edge-based network based on the at least one first attribute of the candidate entity and a semantic graph of the edge-based network, wherein the semantic graph comprises a plurality of nodes that correspond to the plurality of attributes, and wherein the at least one partition model is parameterized as a time-evolving function that defines a plurality of first states of the edge-based network as a function of time;

generating time-series data corresponding to a plurality of second states of the plurality of first states of the edge-based network between a first time epoch and a second time epoch of the edge-based network, based on the at least one partition model, wherein each state of the plurality of second states corresponds to a respective time instance of a plurality of time instances between the first time epoch and the second time epoch;

generating stability data for the edge-based network, based on the time-series data and a scalar function, wherein the stability data indicates at least one scalar measurement of stability antipattern for the edge-based network, and wherein the at least one scalar measurement corresponds to at least one solution of an optimization problem for at least one time instance of the plurality of time instances between the first time epoch and the second time epoch;

determining a curvature of a state transition for the edge-based network between the plurality of time instances, based on the stability data, wherein the at least one solution of the optimization problem defines the state transition for the edge-based network;

determining at least one second attribute of the plurality of attributes, based on the stability data and the curvature of the state transition, wherein the at least one second attribute is associated with a causal entity of the plurality of entities that contributes to the instability in the edge-based network; and generating, the root cause data corresponding to the instability in the edge-based network, based on the at least one second attribute of the causal entity.

18. The computer-program product of claim 17, wherein the operations further comprise:

querying the semantic graph based on the at least one first attribute of the candidate entity; and extracting at least one node of the plurality of nodes, based on the query of the semantic graph, wherein the at least one node corresponds to the at least one first attribute of the candidate entity.

19. The computer-program product of claim 17, wherein the plurality of attributes comprises a region identifier associated with each entity of the plurality of entities, a device identifier associated with each entity of the plurality of entities, a time epoch for emitting data for each entity of the plurality of entities, and a satellite identifier associated with each entity of the plurality of entities.

20. The computer-program product of claim 17, wherein the operations further comprise:

receiving incident data corresponding to a distributed denial of service in the edge-based network; and extracting the at least one first attribute of the candidate entity based on the incident data.

* * * * *